United States Patent
Walker et al.

(10) Patent No.: US 10,169,791 B2
(45) Date of Patent: Jan. 1, 2019

(54) SYSTEM FOR UTILIZING REDEMPTION INFORMATION

(75) Inventors: Jay S. Walker, Ridgefield, CT (US); Jose A. Suarez, Fairfield, CT (US); T. Scott Case, Wilton, CT (US); Michiko Kobayashi, Stamford, CT (US); Andrew P. Golden, New York, NY (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 13/620,719

(22) Filed: Sep. 15, 2012

(65) Prior Publication Data
US 2013/0226735 A1    Aug. 29, 2013

Related U.S. Application Data

(62) Division of application No. 11/926,769, filed on Oct. 29, 2007, now abandoned, and a division of
(Continued)

(51) Int. Cl.
*G06Q 30/00* (2012.01)
*G06Q 30/06* (2012.01)
*G06Q 30/02* (2012.01)

(52) U.S. Cl.
CPC ......... *G06Q 30/0613* (2013.01); *G06Q 30/02* (2013.01); *G06Q 30/0261* (2013.01);
(Continued)

(58) Field of Classification Search
CPC ........... G06Q 30/0613; G06Q 30/0261; G06Q 30/0268; G06Q 30/0266; G06Q 30/0601; G06Q 30/02; G06Q 30/0269
(Continued)

(56) References Cited

U.S. PATENT DOCUMENTS

| 4,341,951 A | 7/1982 | Benton |
| 4,554,446 A | 11/1985 | Murphy et al. |

(Continued)

FOREIGN PATENT DOCUMENTS

| JP | 10-214284 A | 8/1998 |
| WO | WO-97/16797 A1 | 5/1997 |

(Continued)

OTHER PUBLICATIONS

Bruss, R. J.; "*No Grey Area: Selling a Site Twice is Illegal*;" Chicago Tribune; dated Dec. 2, 1995.
(Continued)

*Primary Examiner* — Luis A Brown
(74) *Attorney, Agent, or Firm* — Alston & Bird LLP

(57) ABSTRACT

A system to determine offers and/or to determine the acceptability of offers based on received information relating to product redemption at a third party. According to one embodiment, the system includes arrangement for a customer to redeem a product from a third party, reception of information relating to a redemption of the product by the customer, reception of an offer to purchase a product for an offer price, determination to accept the offer based on the received information relating to the redemption, determination of an assigned third party at which the offer product may be redeemed based on the received information, and transmission of an acceptance of the offer and an indication of the assigned third party.

21 Claims, 25 Drawing Sheets

Related U.S. Application Data application No. 09/605,818, filed on Jun. 28, 2000, now Pat. No. 7,627,498.

(60) Provisional application No. 60/184,799, filed on Feb. 24, 2000.

(52) U.S. Cl.
CPC ..... *G06Q 30/0266* (2013.01); *G06Q 30/0268* (2013.01); *G06Q 30/0601* (2013.01)

(58) Field of Classification Search
USPC .......... 705/14.49, 14.58, 14.63, 14.65, 14.66
See application file for complete search history.

(56) References Cited

U.S. PATENT DOCUMENTS

| | | | |
|---|---|---|---|
| 4,799,156 A | 1/1989 | Shavit et al. | |
| 4,825,045 A | 4/1989 | Humble | |
| 4,882,675 A | 11/1989 | Nichtberger et al. | |
| 4,947,028 A | 8/1990 | Gorog | |
| 4,992,940 A | 2/1991 | Dworkin | |
| 5,139,542 A | 8/1992 | Sowinski | |
| 5,253,165 A | 10/1993 | Leiseca et al. | |
| 5,256,863 A | 10/1993 | Ferguson et al. | |
| 5,361,201 A | 11/1994 | Jost et al. | |
| 5,434,394 A | 7/1995 | Roach et al. | |
| 5,557,721 A | 9/1996 | Fite et al. | |
| 5,592,560 A | 1/1997 | Deaton et al. | |
| 5,611,051 A | 3/1997 | Pirelli | |
| 5,612,527 A | 3/1997 | Ovadia | |
| 5,710,886 A | 1/1998 | Christensen et al. | |
| 5,739,512 A | 4/1998 | Tognazzzini | |
| 5,758,328 A | 5/1998 | Giovanoli | |
| 5,761,647 A | 6/1998 | Boushy | |
| 5,774,868 A | 6/1998 | Cragun et al. | |
| 5,806,044 A | 9/1998 | Powell | |
| 5,809,144 A | 9/1998 | Sirbu et al. | |
| 5,822,736 A | 10/1998 | Hartman et al. | |
| 5,832,457 A | 11/1998 | O'Brien et al. | |
| 5,842,178 A | 11/1998 | Giovannoli | |
| 5,845,259 A | 12/1998 | West et al. | |
| 5,857,175 A | 1/1999 | Day et al. | |
| 5,864,822 A | 1/1999 | Baker, III | |
| 5,870,714 A | 2/1999 | Shetty et al. | |
| 5,873,069 A | 2/1999 | Reuhl et al. | |
| 5,878,139 A | 3/1999 | Rosen | |
| 5,878,401 A | 3/1999 | Joseph | |
| 5,880,449 A | 3/1999 | Teicher et al. | |
| 5,883,810 A | 3/1999 | Franklin et al. | |
| 5,887,271 A | 3/1999 | Powell | |
| 5,890,136 A | 3/1999 | Kipp | |
| 5,907,830 A | 5/1999 | Engel et al. | |
| 5,923,016 A | 7/1999 | Fredregill et al. | |
| 5,924,078 A | 7/1999 | Naftzger | |
| 5,924,080 A | 7/1999 | Johnson | |
| 5,970,469 A | 10/1999 | Scroggie et al. | |
| 5,988,498 A | 11/1999 | Hoell | |
| 6,009,407 A | 12/1999 | Garg | |
| 6,012,040 A | 1/2000 | Goodwin, III | |
| 6,012,834 A | 1/2000 | Dueck et al. | |
| 6,014,634 A | 1/2000 | Scroggie et al. | |
| 6,017,157 A | 1/2000 | Garfinkle et al. | |
| 6,035,284 A | 3/2000 | Straub et al. | |
| 6,085,168 A | 7/2000 | Mori et al. | |
| 6,085,169 A * | 7/2000 | Walker ................... | G06Q 10/02 705/37 |
| 6,119,099 A | 9/2000 | Walker et al. | |
| 6,129,274 A * | 10/2000 | Suzuki ........................ | 235/381 |
| 6,193,154 B1 | 2/2001 | Phillips et al. | |
| 6,226,365 B1 | 5/2001 | Mashinsky | |
| 6,249,772 B1 * | 6/2001 | Walker ................... | G06Q 20/00 705/26.41 |
| 6,266,651 B1 * | 7/2001 | Woolston ............... | G06Q 20/10 705/26.3 |
| 6,332,128 B1 | 12/2001 | Nicholson | |
| 6,370,513 B1 | 4/2002 | Kolawa et al. | |
| 6,385,591 B1 * | 5/2002 | Mankoff ................ | G06Q 20/20 705/14.26 |
| 6,512,570 B2 | 1/2003 | Garfinkle et al. | |
| 6,532,435 B1 * | 3/2003 | Aoshika ................. | G06Q 20/10 370/254 |
| 6,571,279 B1 * | 5/2003 | Herz ................. | G06F 17/30867 707/999.01 |
| 6,587,835 B1 * | 7/2003 | Treyz ..................... | G06Q 20/12 705/14.64 |
| 6,615,184 B1 | 9/2003 | Hicks | |
| 6,647,372 B1 * | 11/2003 | Brady .................... | G06Q 20/20 705/14.25 |
| 6,672,912 B2 | 1/2004 | Figueroa | |
| 6,741,188 B1 * | 5/2004 | Miller ................. | G06Q 30/0255 340/539.13 |
| 6,754,636 B1 * | 6/2004 | Walker ................... | G06Q 20/00 705/14.26 |
| 6,810,385 B1 * | 10/2004 | Brady .................. | G06Q 20/202 705/14.1 |
| 6,970,837 B1 * | 11/2005 | Walker ................... | G06Q 20/10 705/14.26 |
| 6,993,503 B1 * | 1/2006 | Heissenbuttel ...... | G06Q 10/087 705/26.4 |
| 7,039,603 B2 * | 5/2006 | Walker ................... | G06Q 20/00 705/14.13 |
| 7,080,050 B1 * | 7/2006 | Himmelstein ....... | G06Q 20/382 705/37 |
| 7,236,952 B1 * | 6/2007 | D'Zmura ............... | G06Q 40/04 705/36 R |
| 7,472,074 B1 * | 12/2008 | Walker et al. ............. | 705/26.82 |
| 7,577,582 B1 * | 8/2009 | Ojha ...................... | G06Q 30/06 705/26.3 |
| 7,627,498 B1 * | 12/2009 | Walker ................... | G06Q 30/02 705/26.1 |
| 7,711,604 B1 * | 5/2010 | Walker ................. | G06Q 30/0621 705/26.5 |
| 2002/0116287 A1 * | 8/2002 | Schubert ................ | G06Q 30/06 705/26.61 |
| 2002/0174019 A1 * | 11/2002 | Henderson ............. | G06Q 30/02 705/26.4 |
| 2002/0178071 A1 * | 11/2002 | Walker ................... | G06Q 20/00 705/26.41 |
| 2004/0243478 A1 * | 12/2004 | Walker ................. | G06Q 10/087 705/26.1 |
| 2006/0129456 A1 * | 6/2006 | Walker ............... | G06Q 30/0238 705/14.38 |
| 2006/0224456 A1 * | 10/2006 | Walker ................... | G06Q 30/02 705/14.1 |
| 2006/0235754 A1 * | 10/2006 | Walker ................. | G06Q 10/087 705/15 |
| 2006/0242028 A1 * | 10/2006 | Walker ................. | G06Q 10/087 705/26.4 |
| 2006/0242036 A1 * | 10/2006 | Walker ................. | G06Q 10/087 705/34 |
| 2007/0208625 A1 * | 9/2007 | Walker ............... | G06Q 30/0621 705/17 |
| 2008/0052186 A1 * | 2/2008 | Walker ................... | G06Q 30/02 705/26.1 |
| 2008/0052189 A1 * | 2/2008 | Walker ................. | G06Q 10/087 705/26.1 |
| 2011/0099082 A1 * | 4/2011 | Walker ................... | G06Q 30/00 705/26.8 |

FOREIGN PATENT DOCUMENTS

| | | |
|---|---|---|
| WO | WO-97/23838 A1 | 7/1997 |
| WO | WO-98/21713 A2 | 5/1998 |

OTHER PUBLICATIONS

Fallon, J.; "*Safeway Puts Ordering into Customers' Palms*;" Executive Technology; dated Jan. 1999.

(56) References Cited

OTHER PUBLICATIONS

Frederick, J.; "*Walgreens Gears for Opening of its Own Internet Pharmacy*;" Drug Store News, vol. 9, No. 7; dated Jul. 19, 1999.
Kerch, S.; "*Quick Look at Quickly Selling in Tough Market 'How to Sell Your Home Fast' Offers Tips on Everything from Negotiating to Sprucing Up*;" Chicago Tribune; dated Dec. 30, 1983.
Lazarus, D.; "*E-Commerce, Japanese Style*;" Wired Online; dated Jun. 7, 1999; retrieved from <http://www.wired.com>.
Lee, I. H., et al.; "*A Theory in Economic Obsolescence*;" Blackwell Publishers Ltd. (UK) Journal of Industrial Economics, vol. 46, No. 3; ISSN: 0022-1821; p. 383; dated Sep. 1998.
Lough, L. A.; "*System Designed to Grow with Area*;" Richmond Times—Dispatch; dated Apr. 24, 1988.
Mecham, M.; "*Tracking the Competition*;" The McGraw-Hill Companies, Inc., Aviation Week and Space Technologies, Aerobyte, vol. 149, No. 15; p. 17; dated Oct. 12, 1998.
Naik, G.; "*In Digital Dorm, Click on Return for Soda*;" The Wall Street Journal Online; undated.
Talus-Williams, L.; "*Revenue Management: Winning in the 21$^{st}$ Century*;" NABE—National Association for Business Economics; retrieved on Feb. 2, 2000 from <http://www.nabe.com/download>.
Ward SR., M.; "*The Center of the Universe: Can Point-of-Sale Technology Keep Up with The Demands Placed on it?*" National Petroleum News, vol. 91, No. 4; p. 28; dated Apr. 1, 1999; ISSN: 0149-5267.
Barons Dictionary of Reale Estate Terms, definition of comparative sales, dated 1987.
Brochure: "*Reaching Out in New Directions*;" First Data Corporation, Merchant Service; undated.
"*Circuit City to Integrate E-Commerce with Store Shopping: Retailer's E-Superstore—www.circuitcity.com—to Open in July*;" PR Newswire, Financial News; dated Jun. 15, 1999.
"*Computer Science House: Projects: Drink Machine*;" retrieved on Jan. 29, 1998 from <http://www.cshrit.edu/proj/drink.html>.
"*FAQ: CSH Coke Machine Information*;" FAQ, vol. 1.2; dated May 23, 1994; retrieved from <http://www.csu.unl/wais/html/na-dir/csh-coke-machine-info.html>.
"*Groceries Online*;" Groceries Online; dated 1996; retrieved from <http://www.groceries-online.com/>.
"*iChoose, Bizrate.com Team to Help Consumers Make Smart Choices When Buying Online; Consumer Ratings Available Through iChoose Online Savings Alert*;" Financial News, PR Newswire Association, Inc.; dated Jan. 3, 2000.
"*Internet Wine Gift Company Offers Answer to Recent Legislation*;" Send.com; dated Aug. 10, 1999.
"*Official Hagglezone Rules*;" retrieved on Feb. 11, 2000 from <http://www.hagglezone.com>.

"*Patented Price Check System*;" American Electronics Appliances Furniture; retrieved on Feb. 3, 2000 from <http://www.americantv.com/Price_Checks/price_checks.html>.
*Reno Air Selects Behavheuristics, New Automated Online Pricing Solution*: PR Newswire—financial news; dated Oct. 5, 1998.
"*SaveSmart—How SaveSmart Works for Consumers*;" retrieved on Jan. 17, 1999 from <http://www.savesmart.com/consumer/consumer_howitworks.html>.
"*Telepanel Announces New Millennium Plus Electronic Shelf Labels—Next Generation Technology Breakthrough*;" Business Editors/Technology writers, Business Wire, Inc.; dated Feb. 26, 1999.
"*The Role of Responsive Pricing in the Internet*;" retrieved on Feb. 3, 2000 from <http://www.press.umich.edu/jep/works/econ/respons.html>.
"*Uptimeone's E-Commerce Infrastructures Software Renovates Furnitureonline.com into an Interactive Site*;" Business Editors/High-Tech Writers, Business Wire; dated Dec. 13, 1999.
"*Walmart vs. Amazon: The Fight Begins*;" Yahoo News; dated Jun. 9, 1999; retrieved from <http://www.yahoo.com>.
"*Welcome to Planet U, Providers of U-Pons—Internet Coupons*;" retrieved on Mar. 16, 1999 from <http://www.planetu.com/>.
"*What is Revenue Management?*" Revenue Management Systems, Inc.; retrieved on Feb. 2, 2000 from <http://www.revenuemanagement.com>.
"*World Marketplace Website Pricing*;" retrieved on Jan. 19, 2000 from <http://www.juval.com/html>.
"*Wright Express the Wright Choice for Your Fleet Card*;" brochure; undated.
Office Action for U.S. Appl. No. 11/926,769 dated Mar. 5, 2015.
U.S. Appl. No. 09/370,291; entitled *Supplemental Offers Wherein a Buyer Takes Possession at a Retailer of a Primary Product Purchased Through a Purchasing System*; filed Aug. 9, 1999.
U.S. Appl. No. 09/388,723; entitled *Redemption Systems and Methods Wherein a Buyer Takes Possession at a Retailer of a Product Purchased Using a Communication Network*; filed Sep. 2, 1999; first named inventor: Walker.
U.S. Appl. No. 09/540,709; entitled *System to Establish a Customer-Specified Price of a Product and to Manage Redemption of the Product at the Established Price*; filed Mar. 31, 2000; first named inventor: Walker.
Office Action for U.S. Appl. No. 13/620,726 dated Jul. 11, 2013.
Office Action for U.S. Appl. No. 13/620,726 dated Sep. 4, 2014.
Office Action for U.S. Appl. No. 13/620,726 dated Mar. 11, 2014.
Office Action for U.S. Appl. No. 11/926,769 dated Feb. 12, 2014.
Office Action for U.S. Appl. No. 11/926,769 dated May 8, 2012.
Office Action for U.S. Appl. No. 11/926,769 dated Jul. 17, 2013.
Office Action for U.S. Appl. No. 11/926,769 dated Dec. 20, 2012.
Office Action for U.S. Appl. No. 13/620,726 dated May 25, 2016.
Office Action for U.S. Appl. No. 13/620,726 dated Jan. 18, 2017.
Office Action for U.S. Appl. No. 11/926,769 dated Sep. 16, 2014.

\* cited by examiner

| RETAILER IDENTIFIER 810 | RETAILER NAME 820 | LOCATION 830 | TELEPHONE NUMBER 840 | MANAGER NAME 850 | TIER 860 | REGION 870 |
|---|---|---|---|---|---|---|
| R-3252 | AMOCO #36 | 111 ALPHA ST. BETA, USA | (201) 775-4236 | BETTY WHITE | HIGH | A |
| R-9665 | MOBIL #128 | 314 APPLE ST. NORMAL, USA | (973) 551-1221 | JOHN SMITH | HIGH | A |
| R-4251 | TOM'S GAS STATION | 26 ZED RD. WEIRD, USA | (914) 432-3897 | TOM D. HARRY | MEDIUM | A |
| R-6678 | BOB'S DISCOUNT GAS | 10 CHEAP AVE. ST. AUDREY, USA | (408) 232-5991 | BOB LEMON | LOW | B |
| R-1211 | CHEVRON #552 | 1 GULL ST. BIRD, USA | (505) 733-8951 | SARA LEE | MEDIUM | C |

| REGION: A 1010 ||||
|---|---|---|---|
| RETAILER TIER 1020 | LOWEST ACCEPTABLE OFFER PRICE (87 OCTANE) 1030 | LOWEST ACCEPTABLE OFFER PRICE (89 OCTANE) 1040 | LOWEST ACCEPTABLE OFFER PRICE (93 OCTANE) 1050 |
| HIGH | $1.50 / GAL. | $1.65 / GAL. | $1.70 / GAL. |
| MEDIUM | $1.21 / GAL | $1.42 / GAL. | $1.53 / GAL. |
| LOW | $1.00 / GAL. | $1.15 / GAL. | $1.23 / GAL. |

| REDEMPTION IDENTIFIER 1110 | AGREEMENT PRODUCT 1120 | AGREEMENT PRICE 1130 | QUANTITY REMAINING 1140 | RETAILER IDENTIFIER 1150 |
|---|---|---|---|---|
| RED 9291 | 87 OCTANE | $1.45 / GAL. | 20 GAL. | R-4251 |
| RED 2222 | 89 OCTANE | $1.75 / GAL. | 30 GAL. | R-9665 |
| RED 4321 | 93 OCTANE | $1.80 / GAL. | 18 GAL. | R-3252 |
| RED 1234 | 89 OCTANE | $1.60 / GAL. | 40 GAL. | -- |
| RED 9219 | 89 OCTANE | $1.63 / GAL. | 26.5 GAL. | R-4251 |

| REDEMPTION IDENTIFIER 1210 | RETAILER IDENTIFIER 1220 | PRODUCT 1230 | RETAIL PRICE 1240 | QUANTITY REDEEMED 1250 | TIME REDEEMED 1260 | ADDITIONAL PURCHASES 1270 |
|---|---|---|---|---|---|---|
| RED 9291 | R-4251 | 87 OCTANE | $1.50 / GAL. | 9.5 GAL. | 2/15/03 17:35 | -- |
| RED 4321 | R-3252 | 93 OCTANE | $1.85 / GAL. | 11.2 GAL. | 2/15/03 20:17 | SM. COFFEE $0.99 |
| RED 2222 | R-9665 | 89 OCTANE | $1.83 / GAL. | 12 GAL. | 2/15/03 23:19 | -- |
| RED 1234 | R-3252 | 89 OCTANE | $1.78 / GAL. | 10.5 GAL. | 2/15/03 23:25 | -- |

| REDEMPTION IDENTIFIER 1210 | RETAILER IDENTIFIER 1220 | PRODUCT 1230 | RETAIL PRICE 1240 | QUANTITY REDEEMED 1250 | TIME REDEEMED 1260 | ADDITIONAL PURCHASES 1270 |
|---|---|---|---|---|---|---|
| RED 1234 | R-3252 | 89 OCTANE | $1.78 / GAL. | 10.5 GAL. | 2/15/03 23:25 | -- |

1200

| REDEMPTION IDENTIFIER 1110 | PRODUCT 1120 | AGREEMENT PRICE 1130 | QUANTITY REMAINING 1140 | PREFERRED RETAILER IDENTIFIER 1150 |
|---|---|---|---|---|
| RED 1234 | 89 OCTANE | $1.60 / GAL. | 40 GAL. | -- |

1100

| REGION: A 1410 | | |
|---|---|---|
| RETAILER IDENTIFIER 1420 | TARGET MARKET SHARE 1430 | PRESENT MARKET SHARE 1440 |
| R-3252 | 60% | 50% |
| R-9665 | 25% | 20% |
| R-4251 | 15% | 30% |

1400

| REGION: A 1410 | | |
|---|---|---|
| RETAILER IDENTIFIER 1420 | TARGET MARKET SHARE 1430 | PRESENT MARKET SHARE 1440 |
| R-3252 | 60% | 52.5% |
| R-9665 | 25% | 19% |
| R-4251 | 15% | 28.5% |

1400

| REDEMPTION IDENTIFIER 1110 | AGREEMENT PRODUCT 1120 | AGREEMENT PRICE 1130 | QUANTITY REMAINING 1140 | RETAILER IDENTIFIER 1150 |
|---|---|---|---|---|
| RED 1234 | 89 OCTANE | $1.60 / GAL. | 29.5 GAL. | R-3252 |

| REDEMPTION IDENTIFIER 1210 | RETAILER IDENTIFIER 1220 | PRODUCT 1230 | RETAIL PRICE 1240 | QUANTITY REDEEMED 1250 | TIME REDEEMED 1260 | ADDITIONAL PURCHASES 1270 |
|---|---|---|---|---|---|---|
| RED 1234 | R-3252 | 89 OCTANE | $1.78 / GAL. | 10.5 GAL. | 2/15/03 23:25 | -- |

FIG. 15A

| REDEMPTION IDENTIFIER 1110 | AGREEMENT PRODUCT 1120 | AGREEMENT PRICE 1130 | QUANTITY REMAINING 1140 | RETAILER IDENTIFIER 1150 |
|---|---|---|---|---|
| RED 1234 | 89 OCTANE | $1.60 / GAL. | 40 GAL. | -- |

| REDEMPTION IDENTIFIER 1210 | RETAILER IDENTIFIER 1220 | PRODUCT 1230 | RETAIL PRICE 1240 | QUANTITY REDEEMED 1250 | TIME REDEEMED 1260 | ADDITIONAL PURCHASES 1270 |
|---|---|---|---|---|---|---|
| RED 9219 | R-4251 | 87 OCTANE | $1.50 / GAL. | 9.5 GAL. | 2/15/03 17:35 | -- |

FIG. 16A

| RETAILER IDENTIFIER: R-4251 1310 ||| 
|---|---|---|
| PRODUCT 1320 | RETAIL PRICE 1330 | TIME UPDATED 1340 |
| 87 OCTANE | $1.48 / GAL. | 2/14/03 14:53 |

FIG. 16B

| RETAILER IDENTIFIER: R-4251 1310 ||| 
|---|---|---|
| PRODUCT 1320 | RETAIL PRICE 1330 | TIME UPDATED 1340 |
| 87 OCTANE | $1.48 / GAL. | 2/15/03 17:35 |

FIG. 16C

SYSTEM FOR UTILIZING REDEMPTION INFORMATION

CROSS-REFERENCE TO RELATED APPLICATIONS

The present application is a divisional of U.S. application Ser. No. 11/926,769 filed on Oct. 29, 2007, which is a divisional of U.S. patent application Ser. No. 09/605,818 filed Jun. 28, 2000, for "System and Method for Utilizing Redemption Information", which claims the benefit of U.S. Provisional Patent Application No. 60/184,799 filed Feb. 24, 2000, for "Redemption Feedback Loop For Priceline For Gas", the contents of each of the applications listed are incorporated by reference herein in their entirety.

BACKGROUND OF THE INVENTION

Field of the Invention

The present invention is related to systems for utilizing information generated during a product redemption.

Description of the Related Art

The U.S. patent applications listed above describe various systems for remotely purchasing a product and for subsequently retrieving the product at a local retailer. For example, a customer may access an "online" retailer using his home computer, purchase a product from the retailer and pick up the product at a nearby "brick and mortar" retailer. As a result, these systems advantageously provide the ease and convenience of online shopping as well as the near-immediate gratification of traditional shopping.

In order to facilitate the foregoing process, certain embodiments utilize a central controller with which the customer interacts. Specifically, the customer purchases a product from an entity operating the central controller and the central controller identifies a retailer at which the customer may pick up the product. Accordingly, an arrangement exists between the entity and the retailer to allow customer pick-up of products sold by the entity. This arrangement benefits the entity by capturing some sales which would otherwise be lost to traditional retailers. In addition, the retailer benefits by receiving a commission or other revenue based on sales which would otherwise be completely lost to online retailers, and by experiencing increased customer traffic.

Although the above-described systems are believed to be beneficial, it would be advantageous to utilize information generated and/or made available to the controller and the retailer before, during or after product redemption in various alternative ways.

SUMMARY OF THE INVENTION

In view of the foregoing, Applicants have invented a system including arrangement for a customer to redeem a product from a third party, reception of information relating to a redemption of the product by the customer, and determination of whether to accept an offer based on the received information. Along these lines, the inventive system may be embodied in means for preparing for a customer to redeem a product from a third party, means for obtaining of information relating to a redemption of the product by the customer, and means for deciding whether to accept an offer based on the received information.

In another aspect, the invention concerns arrangement for a customer to redeem a product from a third party, reception of information relating to a redemption of the product by the customer, and determination of an offer based on the received information.

The invention also relates to arrangement for a customer to redeem a product from a third party, reception of information relating to a redemption of the product by the customer and determination, based on the received information, of an assigned third party at which an agreement product may be redeemed.

In another embodiment, the invention includes reception of a redemption identifier from a customer, provision of a product to the customer according to an agreement associated with the redemption identifier, transmission of information relating to the providing step to an entity, and reception of authorization from the entity to provide a product according to a second agreement, the authorization based on the transmitted information.

In a further embodiment, the invention includes arrangement for a customer to redeem a product from a third party, reception of information relating to a redemption of the product by the customer from the third party, reception of an offer to purchase an offer product, determination to accept the offer based on the received information, determination of an assigned third party at which the offer product may be redeemed based on the received information, and transmission of an acceptance of the offer and an indication of the assigned third party.

The present invention also concerns means for preparing for a customer to redeem a product from a third party, means for obtaining information relating to a redemption of the product by the customer, and means for deciding to accept an offer based on the obtained information.

By virtue of the foregoing aspects, a relationship with a third party may be utilized to assist in better evaluating and/or formulating future offers.

With these and other advantages and features of the invention that will become hereinafter apparent, the nature of the invention may be more clearly understood by reference to the following detailed description, the appended claims and to the several drawings attached hereto.

BRIEF DESCRIPTION OF THE DRAWINGS

FIG. 6 illustrates a tabular representation of a portion of a retailer database according to one embodiment of the present invention;

FIG. 8 illustrates a tabular representation of a portion of a retailer tier database according to one embodiment of the present invention;

FIG. 9 illustrates a tabular representation of a portion of a redemption tracking database according to one embodiment of the present invention;

FIG. 10 illustrates a tabular representation of a portion of a redemption transaction database according to one embodiment of the present invention;

FIGS. 15A to 15E illustrate tabular representations of portions of databases for use in explaining the FIG. 14 process steps;

FIGS. 16A to 16C illustrate tabular representations of portions of databases for use in explaining the FIG. 14 process steps;

DETAILED DESCRIPTION

Figure 1A:
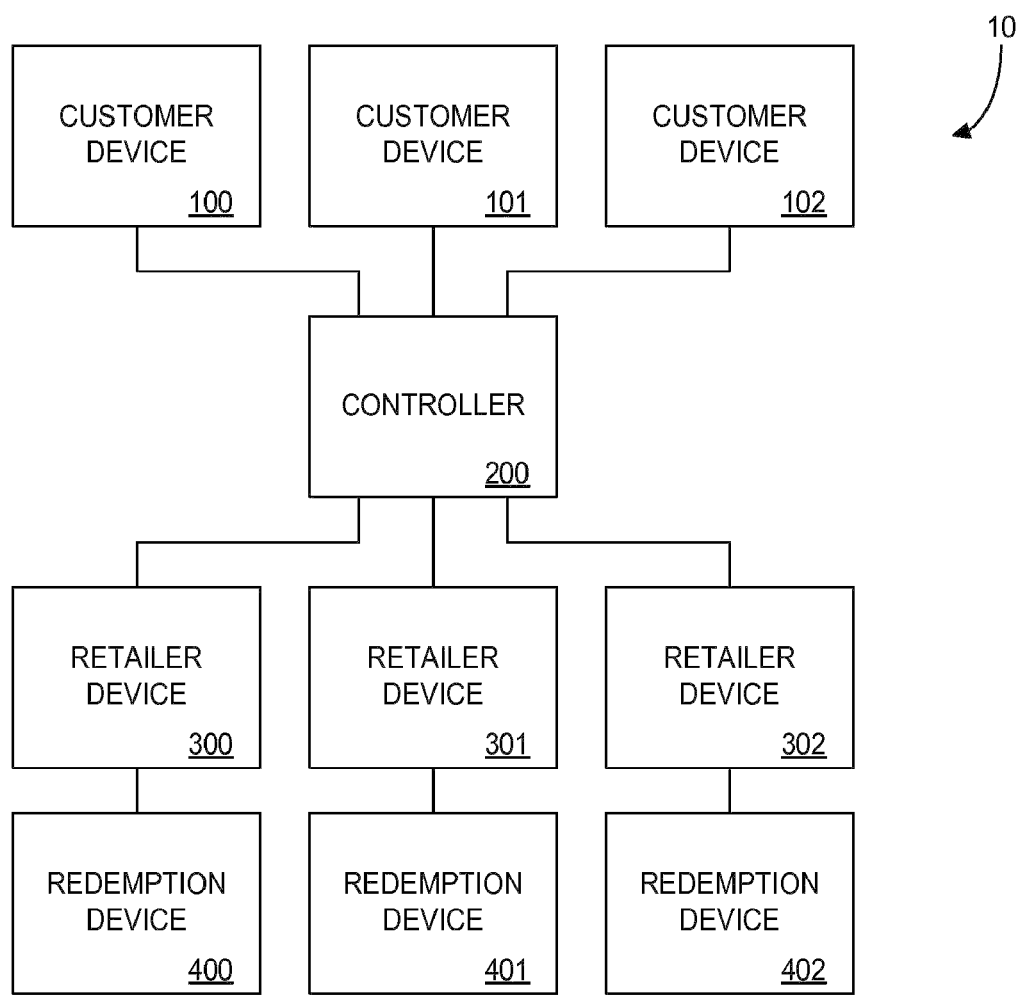
FIG. 1A is a block diagram of a system according to one embodiment of the present invention.

To insure clarity of the following description, set forth below are definitions of several terms used herein. The scope of the present invention is not to be deemed limited by the definitions.

Agreement Product: A product of which a customer agrees to purchase and an entity agrees to supply a number of units. An agreement product may be defined in specific or general terms. For example, a customer may specify as an agreement product Mobil 87 octane gasoline, or any gasoline having an octane rating between 85 and 90.

Agreement Price: A price for which a customer agrees to purchase and an entity agrees to supply a number of units of an agreement product. Examples of an agreement price include a total purchase price for the number of units, a price per unit, a percentage off a retail price, and a dollar amount less than a retail price.

Offer Product: A product of which a customer offers to purchase, or an entity offers to provide, a number of units. After the offer is accepted, the offer product is referred to as an agreement product.

Offer Price: A price for which a customer offers to purchase, or an entity offers to provide, a number of units of an offer product. The offer price is referred to as an agreement price once the offer is accepted.

Retailer: Any person, group of persons, or entity such as a manufacturer, warehouser, department store, grocery store, or gasoline station from which a customer can redeem an agreement product.

As an introduction to the following detailed description, one particular embodiment of the present invention is described. According to this embodiment, a customer accesses a website maintained by a controller and transmits to the website an offer to purchase a product for an offer price. If the offer is acceptable, the controller informs a retailer to provide the product to the customer. The controller also informs the customer that the offer has been accepted, transmits a redemption identifier to the customer, and informs the customer that the redemption identifier must be presented to the retailer in order to redeem the product from the retailer. After the customer redeems the product from the retailer, the retailer transmits redemption information to the controller, such as a retail price of the product at the time of the redemption. The controller then stores the retail price in an appropriate database.

Next, the controller receives an offer to purchase the product for a second offer price. The controller determines whether to accept the offer based on whether the second offer price is within a predetermined range of the stored retail price. If so, the second offer is accepted and the customer is notified as described above. If not, the customer is informed that the offer is not acceptable. Since the controller uses an updated retail price to determine whether to accept the second offer, the controller's ability to determine the acceptability of customer offers is greater than previously provided by conventional systems.

It should be noted that the foregoing embodiment is described as an introduction to the detailed description, and the present invention should not be deemed limited to the particular steps described above.

System

Turning to the drawings, FIG. 1A shows a block diagram of a system 10 according to embodiments of the present invention. As shown, the system 10 includes a controller 200 in communication with customer devices 100, 101 and 102 as well as with retailer devices 300, 301 and 302. Although three customer devices and three retailer devices are shown in FIG. 1A, any number of customer devices and retailer devices may be in communication with the controller 200 according to the invention. Furthermore, although the communication media between the customer devices 100, 101 and 102, the retailer devices 300, 301 and 302 and the controller 200 are represented by dedicated connections, it should be understood that one or more of the customer devices 100, 101 and 102 and of the retailer devices 300, 301 and 302 may be connected to a network, such as a Local Area Network (LAN) or a Wide Area Network (WAN), to which is also connected the controller 200. The network may consist of one or more of an Internet Protocol (IP)-based network, such as the World Wide Web, or one of a satellite-based network, a cellular network, a radio frequency (RF) network, a telephone network, a cable television network, or any other communication media for transferring data between locations.

One or more of the customer devices 100, 101 and 102 may comprise a personal computer, such as those based on the Intel® Pentium® processor, a dedicated terminal or kiosk, an Internet kiosk, a personal digital assistant, a pager, a cellular phone, a pay phone, a video game, an automated teller machine, a slot machine, a watch, a vending machine, an in-car communications system, such as the NAVSTAR system, for providing data such as global positioning system information, traffic information, World Wide Web data or the like, or any other device adapted to communicate with the controller 200 over whatever communication media happen to exist between the device and the controller 200. For example, in a case that the customer device 100 is a personal computer which communicates with the controller 200 over the World Wide Web, the customer device 100 may execute a web browser application for transmitting data to the controller 200 and/or requesting data from the controller 200.

In this regard, the controller 200 may comprise one or more computer servers providing, for example, a database server and a World Wide Web server. Multiple physical devices may be used to perform the functions of the controller 200 according to the present invention, and some or all of these functions may also be performed manually. The controller 200 may be operated by a product manufacturer, such as a gasoline refiner or an electronics manufacturer, by an entity providing customer acquisition services to manufacturers, by an entity providing shopping and retail services to customers, or by any other entity to which the present invention may provide benefits. In the following description, actions which may be performed by an entity operating the controller 200 will be imputed to the controller 200, such as arrangement for a redemption, acceptance of an offer, determination of an offer, payment, reception of payment, etc.

One or more of the retailer devices 300, 301 and 302 may comprise a personal computer or a network server such as an IBM AS/400 server. In one embodiment, each of the retailer devices 300, 301 and 302 is located at a respective retail store and includes data corresponding to its respective retailer. Such data may include inventory data, payroll data, sales data, and any other data used during the operation of a retail establishment. The retailer devices 300, 301 and 302 may also comprise dedicated terminals used primarily in conjunction with the controller 200 to arrange a redemption and to transmit redemption information to the controller 200 in accordance with the present invention, or credit/debit card authorization terminals provided with software enabling operation in accordance with the present invention.

The redemption information transmitted to the controller 200 may include information specifying a particular product redeemed, a quantity of the product redeemed, a location at which the redemption took place, a retailer at which the redemption took place, a date on which the redemption took place, a time at which the redemption took place, a retail price of the redeemed product at the time the redemption took place, an amount of time required to complete the redemption, weather conditions at the time of the redemption, the name of a retailer employee assisting with the redemption, a type of product redeemed (e.g. gasoline), a total amount of money charged to the customer by the retailer, a description of any other purchases, and a total amount charged to the customer for the other purchases. In one embodiment to be described in detail below, the redemption information is used to determine whether to accept an offer.

In communication with respective ones of the retailer devices 300, 301 and 302 are redemption devices 400, 401 and 402. The redemption devices 400, 401 and 402 may communicate with the retailer devices 300, 301 and 302 using known media for transporting electrical signals or other forms of communication, and are used to dispense an agreement product to a customer according to the present invention. For example, the redemption device 400 may be a gasoline pump, a warehouse delivery system, or the like. As described below, each redemption device 400, 401 and 402 may be controlled by a respective retailer device 300, 301 or 302, or by the controller 200. Of course, the invention may be embodied in a system which does not include a redemption device. In one such system, a customer visits a retailer to redeem an agreement product and the retailer simply retrieves and hands the product to the customer.

Figure 1B:
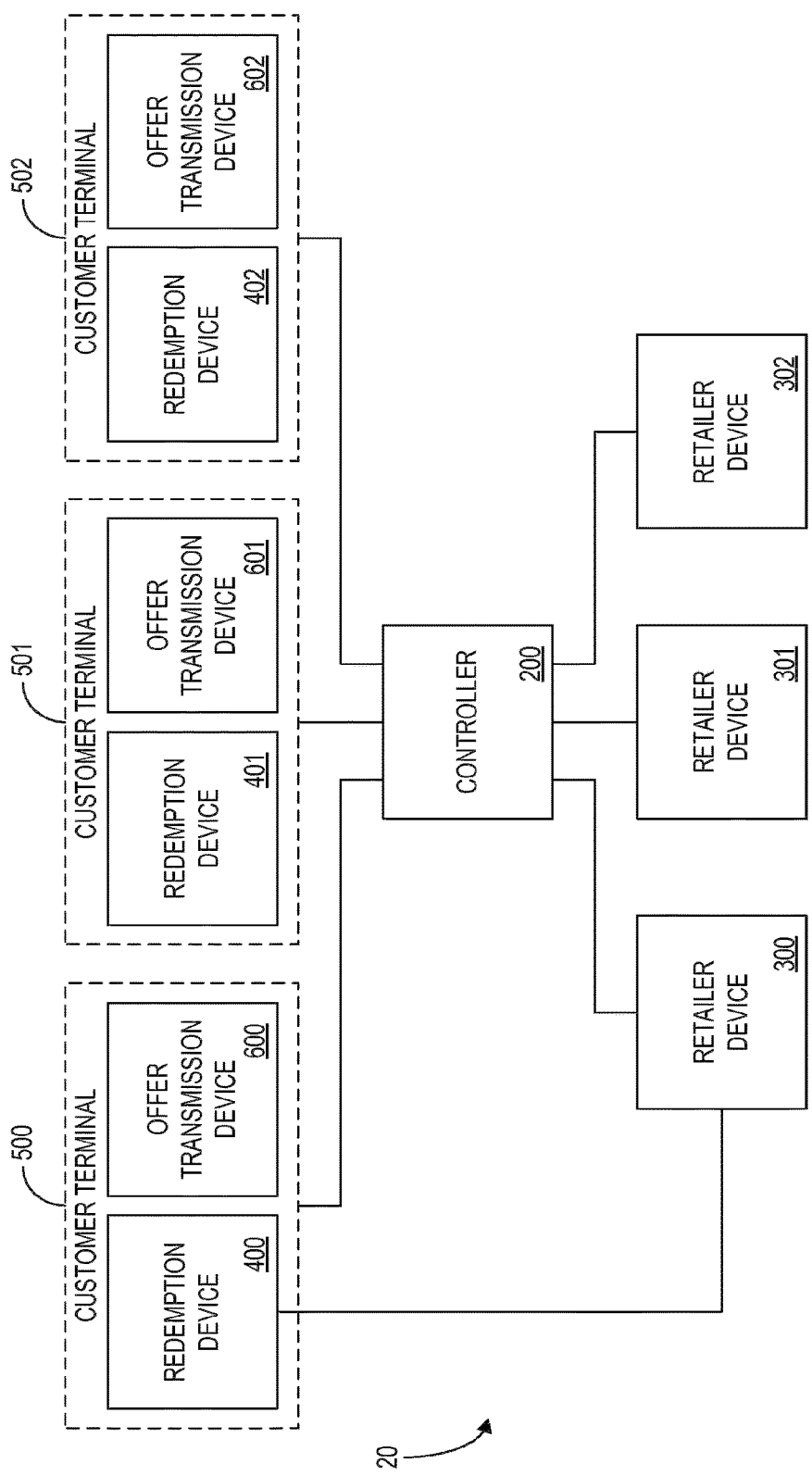
FIG. 1B is a block diagram of a system according to one embodiment of the present invention.

FIG. 1B is a block diagram of a retail system 20 according to other embodiments of the present invention. Shown in FIG. 1B are the controller 200 and the retailer devices 300, 301 and 302, as described with respect to FIG. 1A. Also shown are customer terminals 500, 501 and 502 in communication with the controller 200. Each of the customer terminals 500, 501 and 502 comprises a redemption device and an offer transmission device which, as illustrated by a broken line, may be located in one physical unit or in separate units. Generally the redemption devices 400, 401 and 402 are used to dispense an agreement product to a customer and the offer transmission devices 600, 601 and 602 are used by a customer to submit an offer to or accept an offer from the controller 200. In one embodiment, the customer terminal 500 is a gasoline pump, the redemption device 400 comprises a pumping mechanism, a hose and a nozzle using which gasoline is dispensed, and the offer transmission device 600 comprises an input device such as a keypad and a display, such as a Liquid Crystal Diode, Light Emitting Diode, or flat panel display, using which a customer submits or accepts an offer as described below. The offer transmission device 600 may also be used to display instructions or advertisements to a customer and to receive a redemption identifier or payment information, such as a credit card or debit card number, from the customer.

A retailer device may communicate directly with a customer terminal as well as with the controller 200, as shown with respect to the retailer device 300 and the customer terminal 500. As will be described in detail below, this communication enables the retailer device 300 to send or receive data such as redemption information to or from the customer terminal 400. It should be noted that either a retailer device or customer terminal may be used to transmit data to the controller 200 or to receive data from the controller 200.

In another embodiment, a customer communicates directly with a retailer device 300 using a redemption tool, such as a personal digital assistant or a smartcard. In this regard, communication is established between the redemption tool and the retailer device 300 through an appropriate interface and a redemption identifier is transmitted to the retailer device 300 from the redemption tool. The redemption identifier is cross-referenced against a database accessed by the retailer device 300 to identify details of an agreement associated with the redemption identifier. The retailer then provides an agreement product according to the details of the agreement. Alternatively, the redemption identifier may encode the details of the agreement. According to these embodiments, the retailer device 300 to which the redemption identifier was transmitted and the customer terminal 500 using which the offer was submitted or accepted need not be in communication before, during, or after redemption.

It should be noted that, in some embodiments, a single unit such as a gasoline pump comprises a retailer device, a redemption device and an offer transmission device, and that the single unit is in communication with the controller 200. In other embodiments, a retailer device and a customer device as shown in FIG. 1A are housed in a same unit.

Those skilled in the art will understand that devices in communication with each other need not be continually transmitting to each other. On the contrary, such devices need only to transmit to each other as necessary, and may actually refrain from exchanging data most of the time. For example, a device in communication with another device over the World Wide Web may not transmit data to the other for weeks at a time.

Devices

Controller

Figure 2:
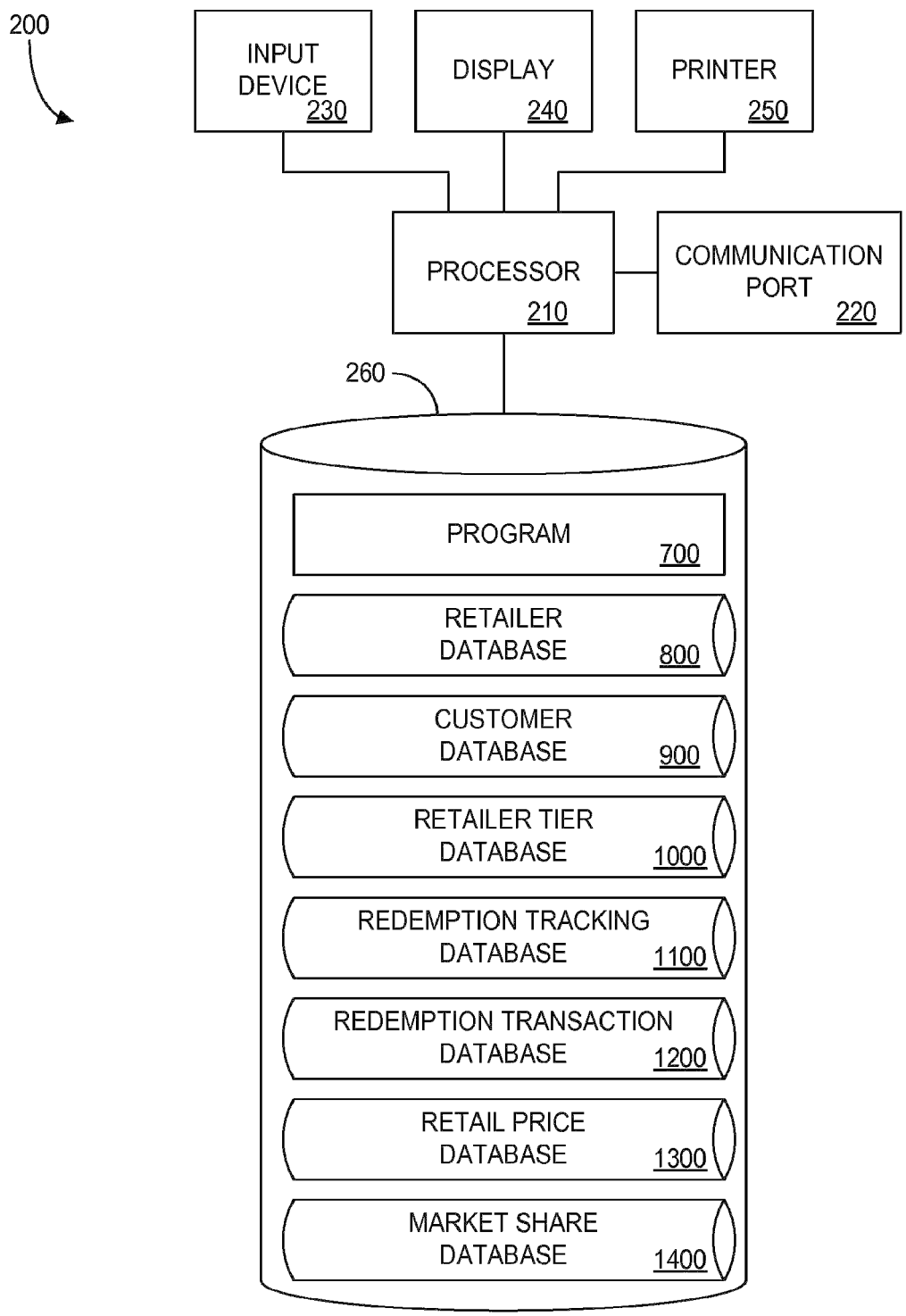
FIG. 2 is a block diagram of a controller according to one embodiment of the present invention.

FIG. 2 illustrates an embodiment of the controller 200. The controller 200 may be implemented using a network server, a dedicated hardware circuit, an appropriately-programmed general purpose computer, or any other electronic, mechanical or electro-mechanical device.

The controller 200 of FIG. 2 comprises a processor 210, such as one or more RISC® processors. The processor 210 is coupled to a communication port 220 through which the controller 200 communicates with other devices. For example, the controller 200 receives redemption information from the retailer devices 300, 301 and 302 through the communication port 220. As mentioned above, each of the retailer devices 300, 301 and 302, as well as the customer devices 100, 101 and 102, may communicate with the controller 200 over different communication media. Accordingly, the communication port 220 is configured, in one embodiment, to communicate using hardware and software protocols of the different media. In addition, the controller 200 can communicate with locally-attached devices through the communication port 220.

Also connected to the processor 210 are an input device 230, a display 240 and a printer 250. The input device 230 may be any device for inputting data, such as a keyboard, a touch screen, a mouse, a voice input device, an infrared port, or the like. The input device 230 can be used by personnel to enter data used by the controller 200 in accordance with the present invention. Data may also be input to the controller 200 using a device connected, either directly or over communication media, to the communication port 220.

The display 240 is used to output graphics and text and may be a CRT computer monitor, a flat panel display or another type of display device. Graphics, text or other data may also be output by the printer 250 in hard copy format. In one embodiment, such data comprises redemption information, agreement information, and transaction histories.

The processor 210 is also in communication with a data storage device 260. The data storage device 260 is generally a data memory and may include any appropriate combination of magnetic, optical and/or semiconductor memory. The data storage device 260 may also include, for example, Random Access Memory (RAM), Read Only Memory (ROM), a compact disc and/or a hard disk. Furthermore, the processor 210 and the storage device 260 may each be, for example: (i) located entirely within a single computer or other computing device; or (ii) connected to each other by remote communication media such as a serial port cable, telephone line or radio frequency transceiver. In one embodiment, the controller 200 comprises one or more computers that are connected to a remote server computer for maintaining databases.

The data storage device 260 stores a program 700 of processor-executable process steps. The processor 210 executes the process steps of the program 700 and thereby operates in accordance with the present invention, and particularly in accordance with the steps described herein with respect to the controller 200. The program 700 may be stored in a compressed, uncompiled and/or encrypted format. The program 700 can be stored in the storage device 260 during manufacture of the storage device 260, can be downloaded from a compact disc or other computer-readable medium, or can be retrieved from a remote or local source through the communication port 220 in the form of a signal having the program 700 encoded thereon. The data storage device 260 also stores processor-executable process steps for basic operation of the controller 200, such as process steps of an operating system, a database management system and "device drivers" for allowing the controller 200 to interface with computer peripheral devices. These latter process steps are known to those skilled in the art, and are therefore not described in detail herein.

According to one embodiment of the present invention, the steps of the program 700 are transferred from the data storage device 260 into a main memory, such as a RAM, and executed therefrom by the processor 210. In alternate embodiments, hard-wired circuitry may be used in place of, or in combination with, processor-executable software process steps for implementation of the processes of the present invention. Thus, embodiments of the present invention are not limited to any specific combination of hardware or software.

The storage device 260 also stores i) a retailer database 800, ii) a customer database 900, iii) a retailer tier database 1000, iv) a redemption tracking database 1100, v) a redemption transaction database 1200, vi) a retail price database 1300, and vii) a market share database 1400. The databases 800 to 1400 are described in detail below and portions thereof are depicted in tabular form with sample entries in the accompanying figures. In this regard, and as will be understood by those skilled in the art, the schematic illustrations and accompanying descriptions of the databases presented herein are merely intended to demonstrate operable systems for associating and storing information which may be used in accordance with the present invention. A number of other data structures may be employed besides those suggested by the tables shown. Similarly, the illustrated entries of the databases represent sample information only; those skilled in the art will understand that the number and content of the entries can be different from those illustrated.

Customer Device

Figure 3:
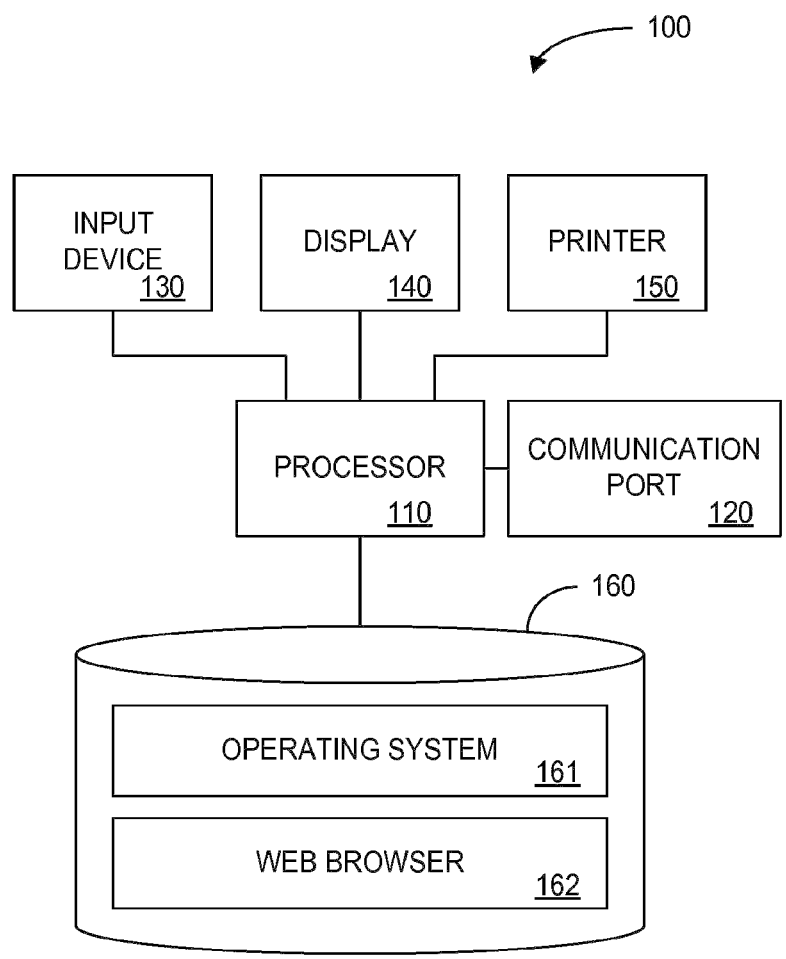
FIG. 3 is a block diagram of a customer device according to one embodiment of the present invention.

FIG. 3 illustrates certain elements of the customer device 100. The customer device 100 is used to input data to and to receive data from the controller 200, and to present data to a customer. For example, a customer may use the customer device 100 to input an offer to the controller 200, or to indicate acceptance of an offer received from the controller 200.

As shown, the customer device 100 includes a processor 110 connected to a communication port 120. Data is transmitted to and received from the controller 200, either via a network or a dedicated connection, through the communication port 120. Also connected to the processor 110 is an input device 130 for receiving data from a customer, a display 140 for displaying data to the customer, and a printer 150 for creating a hardcopy of data, such as of a redemption identifier for use in redeeming a product per an agreement with the controller 200. The input device 130, the display 140 and the printer 150 may comprise any of the input devices, displays, or printers discussed above.

A storage device 160 is also connected to the processor 110, and stores data and processor-executable process steps for the operation of the customer device 100. For example, the storage device 160 stores data and process steps of an operating system 161 which are executed by the processor 110 to control basic operation of the customer device 100. Also stored in the storage device 160 are processor-executable process steps of a web browser 162 which can be executed by the processor 110 to provide communication between the customer device 100 and the controller 200 through the World Wide Web. Of course, depending on the communication media disposed between the customer device 100 and the controller 200, other known applications or hardware may be needed for the customer device 100 to communicate with the controller 200.

Retailer Device

Figure 4A:
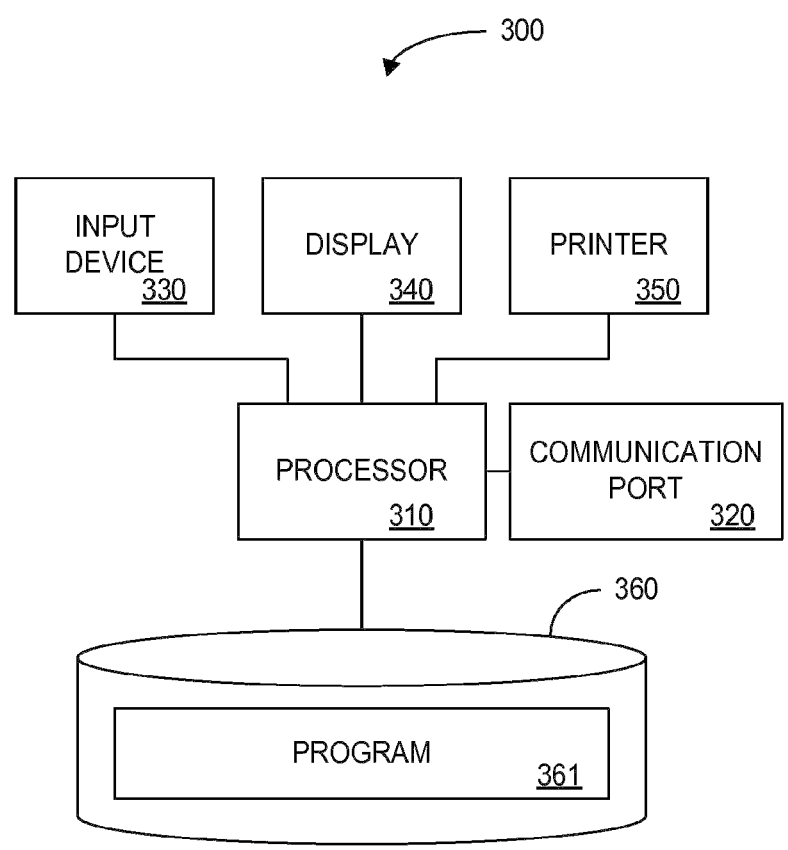
FIG. 4A is a block diagram of a retailer device according to one embodiment of the present invention.

FIG. 4A is a block diagram showing several components of the retailer device 300 according to one embodiment of the invention. According to one version of this embodiment, the retailer device 300 receives a redemption identifier from a customer requesting redemption of an agreement product, transmits the redemption identifier to the controller 200, and receives authorization from the controller 200 to provide a number of units of the agreement product to the customer. The retailer device 300 then provides, or controls another device such as the redemption device 400 to provide, the agreement product to the customer. After the redemption, the retailer device 300 transmits redemption information relating to the redemption to the controller 200.

The retailer device 300 includes a processor 310 for executing processor-executable process steps, and a communication port 320 connected thereto for communicating with the controller 200 over a network or a dedicated connection. The retailer device 300 may also communicate with other retailer devices, customer devices or customer terminals over the communication port 320.

Also connected to the processor 310 are an input device 330, a display 340 and a printer 350. The input device 330 can be used by a retailer to input data and instructions into the retailer device 300, such as data for controlling a customer terminal 500 to dispense an agreement product according to an agreement or redemption information for transmitting to the controller 200. The input device 330 may comprise a keyboard, a voice recognition unit, a touch screen, or other input system. The display 340 displays data to the retailer. For example, the display 340 may display details of a customer agreement with the controller 200, and may comprise any of the display types mentioned above. The printer 350 is used to create hardcopies of data received and/or generated by the retailer device 300, and may comprise a laser printer, a thermal printer, an ink jet printer, or the like.

A storage device 360 is connected to the processor 310, and stores processor-executable process steps of a program 361 which are executed by the processor 310 so as to allow the retailer device 300 to operate in accordance with the present invention. The process steps of the program 361 can be stored in the storage device 360 during manufacture of the storage device 360, can be downloaded from a compact disc or other computer-readable medium, or can be retrieved from a remote or local source through the communication port 320 in the form of a signal having the process steps encoded thereon. In one embodiment, the processor-executable process steps of the program 361 are executed by the processor 310 to receive a redemption identifier from a customer, to decode the redemption identifier so as to determine details of an agreement, to control the redemption device 400 to provide the product to the customer in accordance with the details of the agreement, and to transmit redemption information to the controller 200.

Figure 4B:
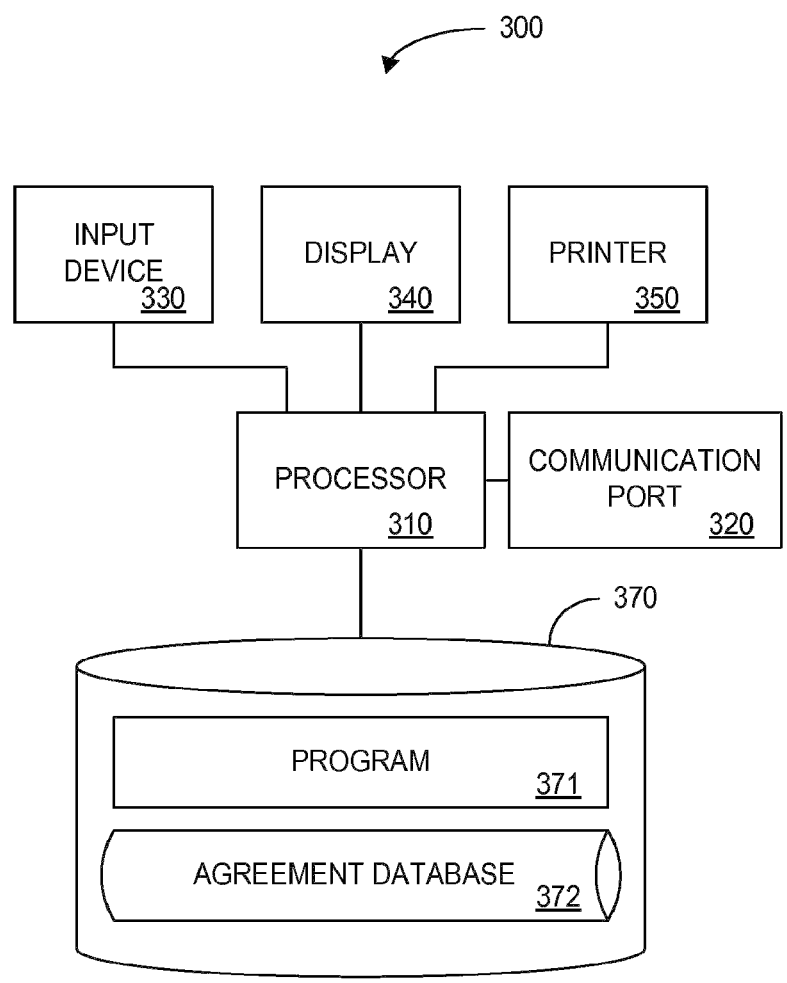
FIG. 4B is a block diagram of a retailer device according to one embodiment of the present invention.

FIG. 4B is a block diagram of the retailer device 300 according to another embodiment of the invention. The reader is referred to the description of FIG. 4A for descriptions of the elements of FIG. 4B that are numbered identically to elements of FIG. 4A.

In contrast to the retailer device 300 of FIG. 4A, the data storage device 370 of FIG. 4B contains an agreement database 372 as well as processor-executable process steps of a program 371. The agreement database 372 may include several redemption identifiers, each associated with details of an agreement between a customer and the controller 200. In this regard, the program 371 may include process steps executable by the processor 310 to receive details of an agreement from the controller 200, to store the agreement details in an agreement database 372, to receive a redemption identifier from a customer, to determine an agreement product and a number of units of the agreement product to provide to the customer based on agreement details associated with the redemption identifier in the agreement database 372, to control the redemption device 400 to provide up to the determined number of units of the agreement product to the customer, to receive redemption information from the redemption device 400, to update the agreement database 372 in accordance with the received redemption information, and to transmit the redemption information to the controller 200.

Customer Terminal

Figure 5:
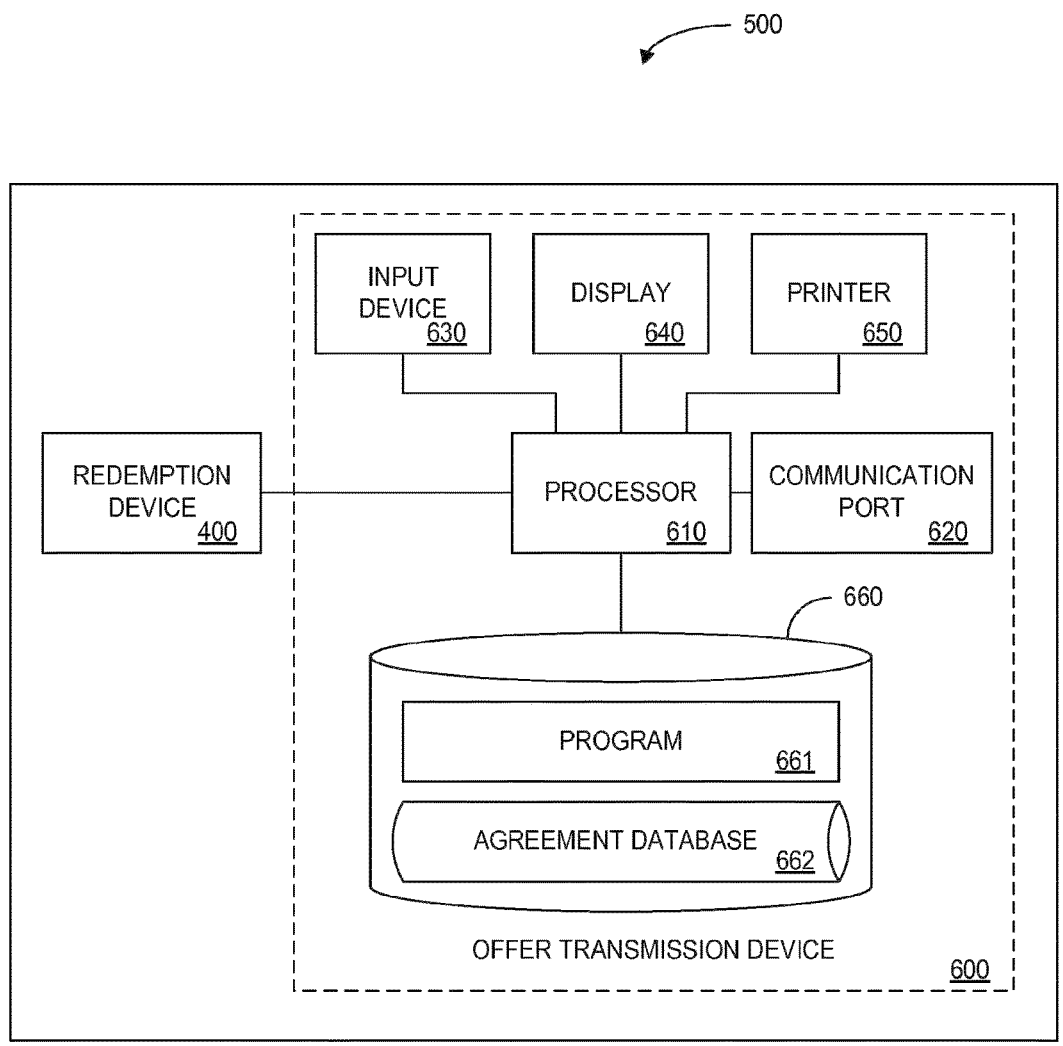
FIG. 5 is a block diagram of a customer terminal according to one embodiment of the present invention.

FIG. 5 is a block diagram of several elements of the customer terminal 500 in accordance with one embodiment of the present invention. As shown in FIG. 5, the customer terminal 500 includes a processor 610 connected to a communication port 620, an input device 630, a display 640 and a printer 650. The communication port 620 is adapted to allow communication between the customer terminal 500 and the controller 200, retailer device 300, and/or the customer device 100, directly or over a network. The input device 630 may consist of a card reader, a keypad, a keyboard, a voice recognition system, or the like, and is used by a customer to make a credit card or debit card payment, to input a redemption identifier, to establish an agreement with the controller 200, to modify an existing agreement or to terminate an agreement. The display 640 is used to display instructions and data to the customer, and the printer 650 may be used to provide the customer with a record of a redemption, or with a redemption identifier or voucher for use in subsequent redemptions.

The redemption device 400 of the customer terminal 500 is controlled by the processor 610 to dispense a product according to an agreement between a customer and the controller 200. In a case that the product is gasoline, the redemption device 400 includes a pump, hose, nozzle and related electrical, mechanical and hydraulic equipment needed to dispense gasoline to a customer.

Also included in the customer terminal 500 and connected to the processor 610 is a storage device 660 storing processor-executable process steps of a program 661 using which the customer terminal 500 operates in conjunction with embodiments of the invention. The process steps of the program 661 can be stored in the storage device 660 during manufacture of the storage device 660, can be downloaded from a compact disc or other computer-readable medium, or can be retrieved from a remote or local source through the communication port 620 in the form of a signal having the process steps encoded thereon. Generally, and according to one embodiment, the processor 610 executes the processor-executable process steps of the program 661 to receive a redemption identifier and details of an associated agreement from the controller 200, to store the redemption identifier and the associated agreement details in the agreement database 662, to receive a redemption identifier from a customer, to locate agreement details associated with the received redemption identifier in the agreement database 662, to control the redemption device 400 to dispense a product according to the agreement, and to transmit redemption information to the controller 200 via the communication port 620.

Databases

Retailer Database

FIG. 6 shows a tabular representation of a portion of the retailer database 800 according to an embodiment of the present invention in which the agreement products are types of gasoline and the retailers are gasoline retailers, such as refiners or gasoline stations. It should be noted that the fields and data of the other databases described herein also reflect this embodiment. Generally, the information stored in the retailer database 800 may be used to identify a retailer based on a retailer identifier 810, to contact the retailer, to determine whether to accept an offer, to determine an offer to present to a customer and to determine a retailer or retailers to assign to an agreement with a customer.

The database 800 may include any number of records, and includes fields for each record therein. The fields specify: i) a retailer identifier 810 identifying a retailer to which the associated record pertains; ii) a retailer name 820; iii) a location 830; iv) a telephone number 840; v) a manager name 850; vi) a tier 860; and vii) a region 870 in which the retailer is located.

The retailer identifier 810 may identify several retailers, such as retailers in a chain. For example, a retailer identifier 810 may identify a particular Mobil station, all Mobil stations in a geographic area, or all Mobil stations in the U.S.

In the illustrated embodiment, the tier 860 associated with a record is a value based on a relationship between retail prices of the associated retailer and retail prices of other retailers located in a same region. As a result, two retailers offering identical prices may be associated with different tiers 860 because one of the retailers is located in a region including retailers offering higher gasoline prices, while the other retailer is located in a region including retailers offering lower gasoline prices. The tier 860 and the region 870 associated with a retailer are used in one embodiment to determine whether to accept an offer, to determine an offer to present to a customer, and/or to determine a retailer or retailers at which an agreement product must be redeemed. These uses of the tier 860 and the region 870 associated with a retailer are described in detail below.

Customer Database

Figure 7:
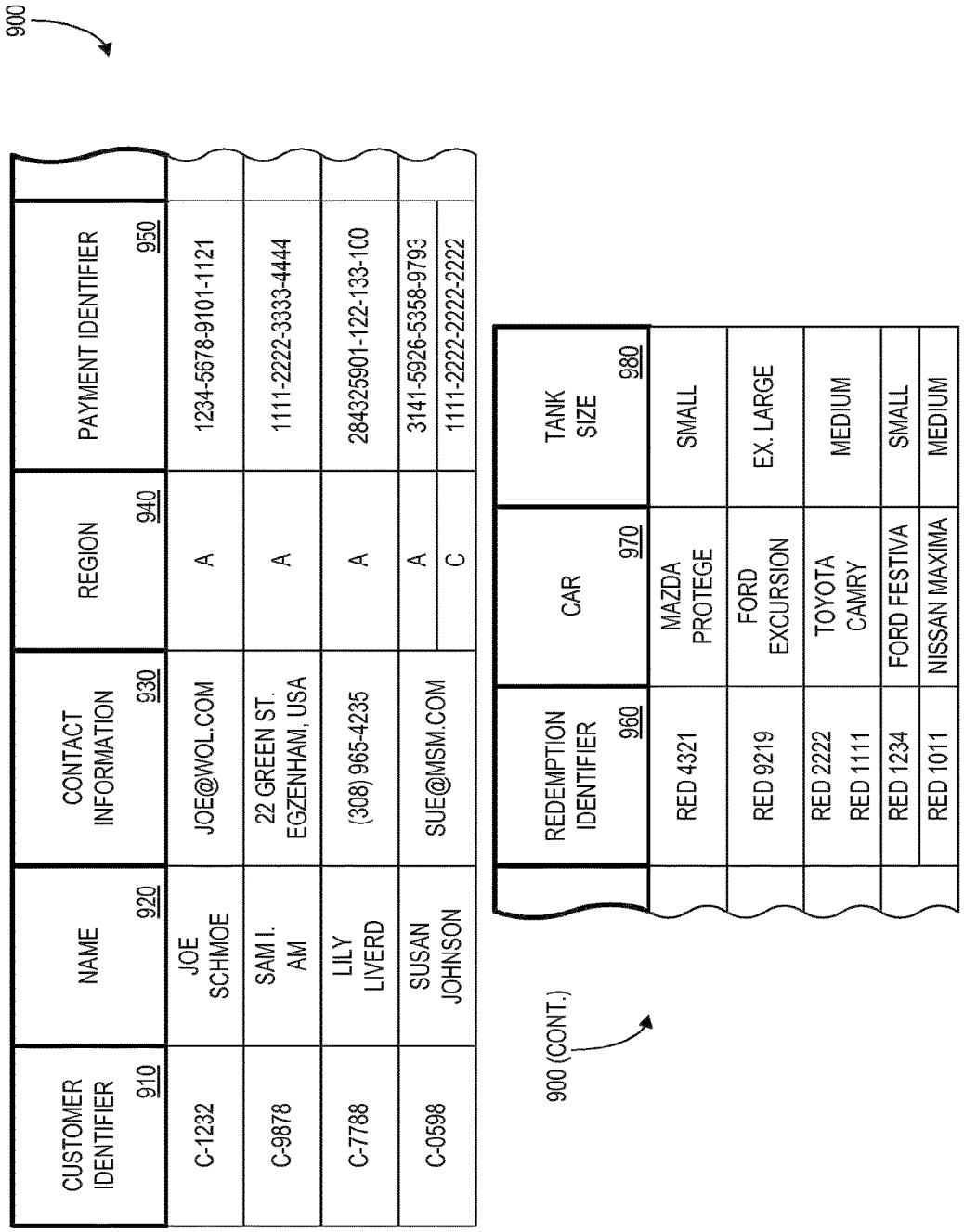
FIG. 7 illustrates a tabular representation of a portion of a customer database according to one embodiment of the present invention.

FIG. 7 shows a tabular representation of a portion of the customer database 900 according to an embodiment of the present invention. The data in the customer database 900 may be used to facilitate customer billing, customer tracking, the determination of whether to accept an offer from a customer, and the determination of offers to present to particular customers. The fields associated with each record in the representation of FIG. 7 specify: i) a customer identifier 910 identifying a customer; ii) a name 920 identifying the name of the associated customer; iii) contact information 930 using which the associated customer may be contacted; iv) a region 940 in which the customer is located, the regions 940 being defined, in one embodiment, identically to the regions 870 of the retailer database 900; v) a payment identifier 950 which may be used to extract payment from the customer; vi) a redemption identifier 960 identifying a particular agreement under which the associated customer may redeem an agreement product; vii) a car 970 using which the associated customer may redeem an agreement product; and viii) a tank size 980 corresponding to the car 970.

It should be noted that a customer may be associated with multiple regions 940 and payment identifiers 950. Regions 940 associated with a customer may be specified by the customer or determined based on an address specified in associated contact information 930. Multiple payment identifiers 950 may be useful to a customer wishing to have several payment options.

A customer may also be associated with multiple redemption identifiers 960 and cars 970. In more detail, a customer may be associated with two redemption identifiers 960, each of which identifies a different agreement and allows for redemption of a same or different agreement product using a single car 970 (see record associated with customer identifier 910 C-7788), or which are tied to specific cars 970 (see record associated with customer identifier 910 C-0598). Moreover, a single redemption identifier 960 may be associated with a single car 970, and a single redemption identifier 960 may be associated with multiple cars 970.

Retailer Tier Database

FIG. 8 illustrates a tabular representation of a portion of the retailer tier database 1000. As shown, the portion includes data for a single region 1010. Of course, the retailer tier database 1000 may also include data corresponding to other regions 1010. In the portion shown, each record is associated with several fields. The fields specify: i) a retailer tier 1020; ii) a lowest acceptable offer price (87 octane) 1030; iii) a lowest acceptable offer price (89 octane) 1040; and iv) a lowest acceptable offer price (93 octane) 1050.

The retailer tier database 1000 may be used to determine how a particular retailer's pricing structure relates to the pricing structures of other retailers in a same region. Accordingly, the data in the retailer tier database 1000 is used in one embodiment to determine to which retailer a customer should be directed for redemption of an agreement product. In one example, the controller 200 determines to accept an offer from a customer to purchase a particular amount of 87 octane gasoline from a retailer in region 1010 "A" for $1.40 per gallon. According to the data in the retailer tier database 1000 of FIG. 8, the customer will be directed only to those retailers in region 1010 "A" which are associated with the "medium" or "low" retail tiers 1020. Such retailers may be identified by reference to associated tier 860 and region 870 data in the retailer database 800.

In an embodiment described in detail below, the data in the retailer tier database 1000 is updated based on redemption information relating to a product redemption received by the controller 200.

Redemption Tracking Database

FIG. 9 shows a tabular representation of a portion of the redemption tracking database 1100. The redemption tracking database 1100 stores details of a previously-established agreement between the controller 200 and the customer, and is therefore used to ensure that product redemption proceeds according to the agreement. Each of the records in the redemption tracking database 1100 includes several fields, specifying: i) a redemption identifier 1110; ii) an agreement product 1120; iii) an agreement price 1130; iv) a quantity remaining 1140; and v) a retailer identifier 1150.

In one embodiment, the redemption identifier 1110 associated with a record can be used to access a corresponding record in the customer database 900 or the redemption tracking database 1100. The agreement product 1120 and the agreement price 1130 associated with a record are defined by the agreement between the controller 200 and the customer which is the subject of the record. The quantity remaining 1140 indicates the quantity of the agreement product still to be redeemed under the associated agreement. Accordingly, if no redemption has occurred under an agreement, the quantity remaining 1140 is equal to the quantity specified under the agreement. The quantity remaining field 1140 may be updated based on redemption information relating to a product redemption, as will be described in detail below. The retailer identifier 1150 identifies the retailer at which the customer is directed to redeem the agreement product under the agreement. The retailer identifier 1150 may be used in conjunction with retailer identifier 810 of the retailer database 800 to obtain data of an associated retailer from the retailer database 800.

In one embodiment using the redemption tracking database 1100, a customer presents a redemption identifier to a retailer using any of the methods described in co-pending U.S. application Ser. Nos. 09/540,707 and 08/889,503. The retailer transmits a redemption identifier to the controller 200 and a record is located in the redemption tracking database 1100 by comparing the received redemption identifier with the redemption identifiers 1110. If the retailer identifier 1150 associated with the located record identifies the retailer from which the redemption identifier was received, the remaining fields of the located record are transmitted back to the retailer, either to the retailer device 300 or to the customer terminal 500. The retailer then authorizes a redemption of up to the quantity remaining 1140 of the agreement product 1120 for the agreement price 1130. If the retailer does not correspond to the retailer identifier 1150 of the located record, the retailer is notified that the redemption is not valid at the retailer, and the retailer is given the option of honoring the agreement. It should be noted that the information stored in the redemption tracking database 1100 may also be stored at a retailer, or that only the information of the redemption tracking database 1100 associated with a particular retailer may be stored at the particular retailer.

Redemption Transaction Database

FIG. 10 illustrates a tabular representation of a portion of the redemption transaction database 1200. Fields of the redemption transaction database 1200 specify: i) a redemption identifier 1210; ii) a retailer identifier 1220; iii) a product 1230; iv) a retail price 1240; v) a quantity redeemed 1250; vi) a time redeemed 1260; and vii) additional purchases 1270. The redemption transaction database 1200 provides information regarding particular redemptions performed according to agreements between customers and the controller 200. According to embodiments of the invention, the information may be used to determine whether to accept customer offers and/or to determine a retailer to assign to an agreement.

In this regard, each record in the redemption transaction database 1200 indicates details of a single redemption performed according to an agreement identified by an associated redemption identifier 1210. In one embodiment, the redemption identifier 1210 is linked to the redemption identifier 1110 of the redemption tracking database 1100 and to the redemption identifier 960 of the customer database 900 in order to easily associate related data. The retailer identifier 1220 identifies a retailer at which the associated redemption occurred, and the product 1230, the retail price 1240 and the quantity redeemed 1250 indicate self-explanatory details of the associated redemption. However, it should be noted that the retail price 1240 may be different from the associated agreement price 1130, and the quantity redeemed 1250 may be more than the associated quantity remaining 1140.

The time redeemed 1260 specifies a date and time at which the associated redemption occurred, and the additional purchases 1270 indicate any purchases made during the redemption other than that of the product 1230. It should be noted that the data shown in the redemption transaction database 1200 are examples of some of the types of redemption information relating to a redemption which may be transmitted to the controller 200 after a redemption. Other types of redemption information are set forth below.

Retail Price Database

Figure 11:
FIG. 11 illustrates a tabular representation of a portion of a retail price database according to one embodiment of the present invention.

Shown in FIG. 11 is a tabular representation of a portion of the retail price database 1300. In one embodiment, the retail price database 1300 contains data which is updated based on received information relating to a redemption and which is used to determine whether to accept an offer from a customer and to determine an offer to present to a customer. The illustrated portion of the retail price database 1300 includes data relating to a retailer associated with a particular retailer identifier 1310. Of course, the retail price database 1300 may also include data relating to other retailers.

The fields shown in FIG. 11 specify: i) a product 1320; ii) a retail price 1330; and iii) a time updated 1340. The product 1320 indicates a product offered by the retailer identified by the retailer identifier 1310, the retail price 1330 specifies a price for which the product 1320 is sold, and the time updated 1340 indicates a date and time at which the associated retail price 1330 was last updated. As described in more detail below, the retail price 1330 may be updated in response to reception of redemption information indicating a new retail price 1330 for the product, based on redemption information indicating a changed price of a different product, or based on other information.

Market Share Database

Figure 12:
FIG. 12 illustrates a tabular representation of a portion of a market share database according to one embodiment of the present invention.

A tabular representation of a portion of the market share database 1400 is shown in FIG. 12. The illustrated portion of the market share database 1400 includes data corresponding to one region 1410. The market share database preferably includes data corresponding to other regions as well. Each record in the database 1400 includes fields specifying: i) a retailer identifier 1420; ii) a target market share 1430; and iii) a present market share 1440.

The target market share 1430 associated with a retailer identifier 1420 identifies the percentage of a relevant market which the controller 200 will attempt to provide to the retailer identified by the retailer identifier 1420. The target market share 1430 may be established by a contract between the retailer and the controller 200. The relevant market may consist of the market for providing agreement products for redemption under agreements with the controller 200, the entire market for particular products, or another market.

The present market share 1440 is determined based on redemption information received by the controller 200. For example, if half of all redemptions under agreements between customers and the controller 200 occur at one retailer, the present market share 1440 may be 50 percent. Again, the market can be defined in many ways, including based on the number of redemptions, on the amount of money spent during redemptions, or by another market measure.

Generally, the market share database 1400 may be used to assign a retailer to an agreement. To redeem an agreement product under an agreement, a customer is instructed to visit a retailer assigned to the agreement and to present a redemption identifier to the assigned retailer. Accordingly, in some embodiments, an agreement product may be redeemed under an agreement only at a retailer assigned to the agreement. For example, since, according to FIG. 12, the retailer identified by the retailer identifier 1420 R-4251 is associated with a present market share 1440 greater than the associated target market share 1430, the controller 200 may determine not to assign the retailer to a particular agreement.

Processes

Figure 13:
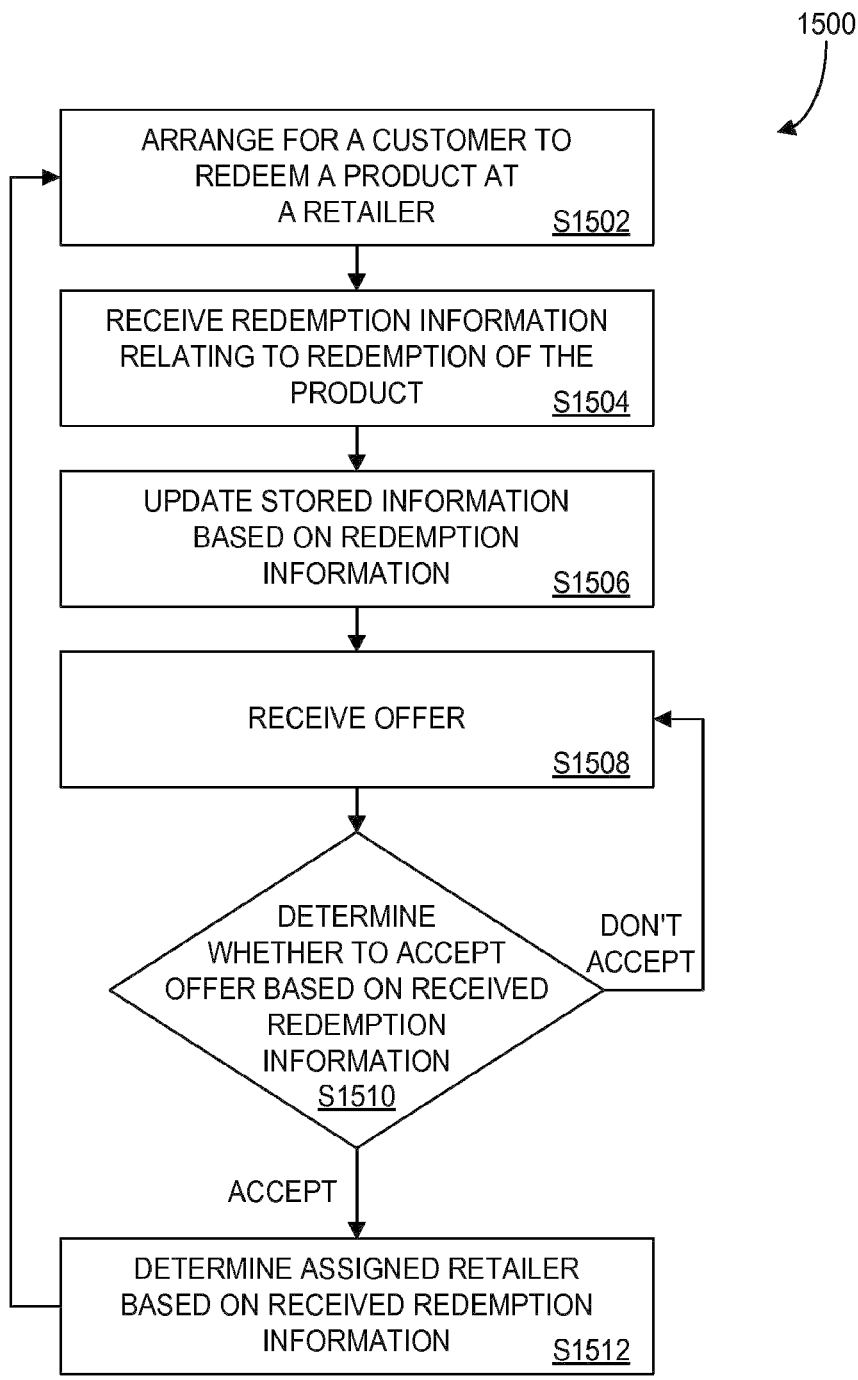
FIG. 13 is a flow chart of process steps of a transaction according to one embodiment of the present invention.

FIG. 13 is a flow chart of process steps 1500 according to one embodiment of the present invention. In a case that the controller 200 performs the process steps 1500, the process steps 1500 may be embodied in hardware within the controller 200, in processor-executable process steps stored on a computer-readable medium such as the data storage device 260 and executed by the processor 210, in processor-executable process steps encoded in an electronic signal received by the controller 200 and executed by the processor 210, or in any combination thereof. It should be noted that the process steps 1500 may be executed, wholly or in part, by processors located in several devices or even manually.

It should also be noted that each other flow chart of process steps described herein may be similarly embodied. In addition, the particular arrangements of elements in the flow chart of FIG. 13, as well as in the flow charts discussed below, is not meant to imply a necessary order to the steps; embodiments of the present invention can be practiced in many different orders.

Briefly, the process steps 1500 include arrangement for a customer to redeem a product from a third party, reception of information relating to a redemption of the product by the customer, and determination of whether to accept an offer based on the received information. As a result, the process steps 1500 provide the benefits of redemption at a third party as well as information which may prove useful in evaluation of subsequent offers.

The process steps 1500 begin at step S1502, in which it is arranged for a customer to redeem a product from a third party retailer. The arrangement in step S1502 may occur in any number of ways, such as those described in co-pending application Ser. Nos. 08/889,503 and 09/540,707. For example, an entity operating the controller 200 may enter into a legal contract with a third party retailer to have the third party retailer provide redemption services to customers directed to the retailer by the entity. In one embodiment, the controller 200 enters into an agreement with Exxon allowing customers to redeem an agreement product at any Exxon retailer. In addition, the arrangement in step S1502 may comprise notifying a third party retailer of a redemption identifier provided to the customer, with an understanding that the retailer will provide redemption to any customer presenting the redemption identifier to the retailer. Moreover, step S1502 may include informing a customer of a particular retailer at which the customer should redeem an agreement product under an agreement, without any contact between the controller 200 and the retailer.

Next, in step S1504, redemption information is received relating to redemption of the product. It should be noted that, in one embodiment, the customer has presented, prior to step S1504, a redemption identifier to the third party retailer and, in response, the retailer has provided the product to the customer. The redemption information is transmitted to the controller 200 before, during, or after this redemption.

The received redemption information may be obtained by the retailer from any of several sources. As mentioned above, the redemption information received in step S1504 may include information regarding the particular product redeemed, the quantity of the product redeemed, the location at which the redemption took place, the retailer at which the redemption took place, the date on which the redemption took place, the time at which the redemption took place, the retail price of the redeemed product at the time the redemption took place, the amount of time required to complete the redemption, the weather at the time of the redemption, the name of the retailer employee assisting with the redemption, the type of product (e.g. gasoline, 87 octane gasoline), the total amount of money charged to the customer by the retailer, a description of any other purchases, and a total amount charged to the customer for the other purchases.

The redemption information may be received by the controller 200 in step S1504 in many ways. The redemption information may be received directly from the retailer device 300 or from the customer terminal 400. In another example, the controller 200 may issue a special card to a customer which encodes information identifying the customer. The card operates as a credit card over a fleet card system configured to capture information associated with transactions performed using fleet credit cards. Accordingly, each time a customer redeems a product using the fleet credit card, the information is automatically sent to the controller 200. The information may be sent in real-time or it may be time delayed. The information may be sent for each redemption separately, or it may be sent in a batch along with information relating to other redemptions. Moreover, the redemption information may be sent by another party such as a credit or debit card network administrator or a credit card clearing house.

The redemption information may also be received from the customer in step S1504. In this regard, the customer may be instructed to telephone the controller 200 or to otherwise access the controller 200 using a customer device and to report a current retail price of a product at a retailer. The customer may be provided with an incentive to report the price, such as a price discount or other incentive. The customer may also accumulate discounts based on a number of prices reported.

Returning to the process steps 1500, flow continues from step S1504 to step S1506, wherein stored information is updated based on the received redemption information. The update in step S1506 may simply include storing the received redemption information in the redemption tracking database 1100 along with a redemption identifier 1110 identifying the redemption. The controller 200 may use received price information to update data in the retail price database 1300, specifically the retail price 1330 and the time updated 1340 associated with a particular product 1320. Additionally, the controller 200 may use received price information to compute a new average retail price based on a last five received retail prices and to store the computed average retail price in step S1506.

Information relating to a redemption of a product at a retailer may also be used to update information stored with respect to another retailer in step S1506. In this regard, historical data may show that two retailers charge identical prices for a particular product. For example, two such retailers may belong to a same retail chain and be located in a same geographic region. If a retail price charged by one of the retailers is received in step S1504, this information may be used to update the portion of the retail price database 1300 storing the retail price 1330 associated with the second retailer. Similarly, if historical data indicates that the second retailer charges three cents more for the product than the first retailer, the portion of the retail price database 1300 associated with the second retailer is updated by adding three cents to the retail price information received from the first retailer and by storing the sum in the appropriate record of the retail price field 1330.

Redemption information relating to one product may be used to update information relating to another product in step S1506. As an example, historical data may indicate that a retail price for 89 octane gasoline is ten cents higher than a retail price for 87 octane gasoline at a particular retailer.

Therefore, upon receiving redemption information in step S1504 indicating that a retail price of 87 octane gasoline at a time of redemption was $1.50 per gallon, the controller 200 updates the retail price 1330 associated with the retailer and with 87 octane gasoline to reflect $1.50 per gallon, and also updates the retail price 1330 associated with the retailer and with 89 octane gasoline to reflect $1.60 per gallon.

Updating stored information based on received redemption information in step S1506 may also include adding new information to stored information already stored in the controller 200. For example, upon receiving redemption information relating to redemption of a product in step S1504, it is noted that the retailer at which the product was redeemed is not represented in any of the databases of the data storage device 260. Therefore, the controller 200 creates records in the retailer database 800, the retail price database 1300, and the market share database 1400 corresponding to the retailer.

The received redemption information may also be used in step S1506 to update stored information associated with a customer. In this regard, a received redemption quantity can be used to calculate an average quantity redeemed by the customer per visit, per other event, or per time period, which may then be stored in association with the customer. The received information may also be used to identify a retailer at which the customer most often redeems agreement products, which may also be stored in association with the customer.

The present market share 1440 of the market share database 1400 may be updated in step S1506 using received redemption information. Specifically, redemption information identifying a retailer at which a redemption took place will likely affect the present market share 1440 of each retailer identified by the retailer identifiers 1420 in the market share database 1400. As described above, the market share tracked by the market share database 1400 may relate to a number of visits, a total amount spent by customers redeeming products, a total amount of products sold, or the like.

In another example, a retail price received from a retailer in step S1504 indicates that, based on the retailer tier database 1000, the retailer is assigned to an incorrect price tier. Accordingly, in step S1506, the tier 860 associated with the retailer in the retailer database 800 is correspondingly updated.

After step S1506, an offer is received in step S1508. The offer may be received by the controller 200 from the customer involved in steps S1502 and S1504, or from a second customer. The offer may be received in any manner, including those specified in application Ser. Nos. 08/889,503 and 09/540,707. As described in Ser. No. 09/540,707, a customer may utilize the customer device 100 or the customer terminal 500 (specifically the offer transmission device 600) to initiate communication with the controller 200. The customer then submits an offer to purchase an offer product for an offer price. The offer may include a number of units of the offer product, a maximum number of units that may be redeemed at one time, and/or other terms. Although the process steps 1500 assume that the received offer is binding on the customer if accepted by the controller, it should be noted that in other embodiments, the offer is not binding on the customer.

After the offer is received in step S1508, it is determined, in step S1510, whether to accept the offer based on the redemption information received in step S1504. It should be noted that since stored information may be updated using the received redemption information, the determination of step S1510 includes determinations based on the updated stored information.

The determination in step S1510 may proceed in any of the manners described in application Ser. No. 09/540,709. For example, an offer may be received in step S1508 to purchase 20 gallons of 87 octane gasoline for $1.25 per gallon. In step S1510, the controller 200 identifies that, according to the retail price database 1300, the retailer identified by the retailer identifier 1310 R-4251 currently sells 87 octane gasoline for a retail price 1330 of $1.48 per gallon. Assuming that the controller 200 is instructed to accept any offer prices up to thirty cents below the currently available retail price, it is determined in step S1510 to accept the offer received in step S1508.

Of course, redemption information other than a retail price may be used in the determination of step S1510. The controller 200 may accept an offer based on information such as an average additional purchase amount made at a retailer, promotions available at a retailer, a target market share corresponding to a retailer, a present market share possessed by a retailer, a time of day (week, month) at which customer volume at a retailer is high or low, most recent retail prices for related products at each retailer, purchasing history of the customer, offers made by each customer, information relating to offers made by each customer, redemption history of each customer, date and time of a past redemption, a number of units redeemed during a previous redemption, or an average retail price of a product at all retailers.

As another example of step S1510, an offer may be received to purchase a product at a particular gasoline retailer. However, according to the retail price database 1300, over one month has elapsed since a retail price 1330 of the product 1320 was last updated. Accordingly, the controller 200 analyzes all retail prices received in the last six months for the particular retailer to determine the volatility of prices at the retailer, and, using the volatility information and information indicating a time elapsed since a last receipt of retail prices for the retailer, the controller 200 estimates current retail prices at the retailer. The estimated current retail prices are then compared with the offer price to determine whether to accept the offer. The estimation may also take into account factors such as volatility of prices at other retailers.

It may be determined to accept the offer in step S1510 simply to obtain a source of retail price feedback for the gasoline retailer if it is determined that too much time has elapsed since a last update of retail prices of the retailer. Moreover, if it is known that fuel prices have been increased by the Organization of Petroleum Exporting Countries (OPEC) since a last time updated 1340 corresponding to the product 1320, the price increase may be used to estimate a current retail price 1330 of the product 1320.

The determination in step S1510 may also be based on a previous offer price and a retail price at a time of redemption. In one example, a previous offer to purchase 40 gallons of 87 octane gasoline for $1.20 per gallon was accepted at a time that the corresponding retail price was $1.30 per gallon. The offer was accepted because the controller 200 was instructed to accept offers specifying an offer price of at most 10 cents per gallon less than a current retail price. Such an instruction may exist to limit costs to the controller 200 in a case that the controller 200 is required to pay any difference between offer prices and retail prices at a time of redemption to the retailer providing the redemption.

However, after redemption of a first 10 gallons of the 40 gallons, received redemption information indicates that the current retail price of 87 octane gas has risen to a $1.50 per gallon. Because of the discrepancy between the offer price and the current retail price, the acceptable difference between the offer price and the retailer price is decreased to 5 cents. Accordingly, if a next offer received in step S1508 specifies an offer price of $1.43 per gallon for 87 octane gas, it is determined in step S1510 not to accept the offer. Flow then returns to step S1508. In another embodiment, the controller 200 indicates to the customer that the offer would be accepted if the offer price is raised by two cents and flow returns to step S1508.

After step S1510, a retailer to assign the agreement to is determined based on the redemption information. For example, the assigned retailer may be a retailer having a lowest retail price 1330 associated with offer product 1320. In embodiments where the controller 200 pays the retailer a difference between the offer price and the retail price, such a method minimizes an amount of money paid from the controller 200 to a retailer. Other methods utilizing redemption information to determine assigned retailers in step S1512 are described in application Ser. Nos. 09/540,709 and 08/889,503, and also below with respect to FIG. 17.

Flow returns from step S1512 to step S1502 to arrange redemption of the offer product at the assigned retailer. It should be noted that in other embodiments flow proceeds from step S1510 to step S1504, because arrangements have been previously made with the retailer to provide redemption to customers of the controller 200 and therefore there is no need to rearrange such redemption with the retailer.

Figure 14:
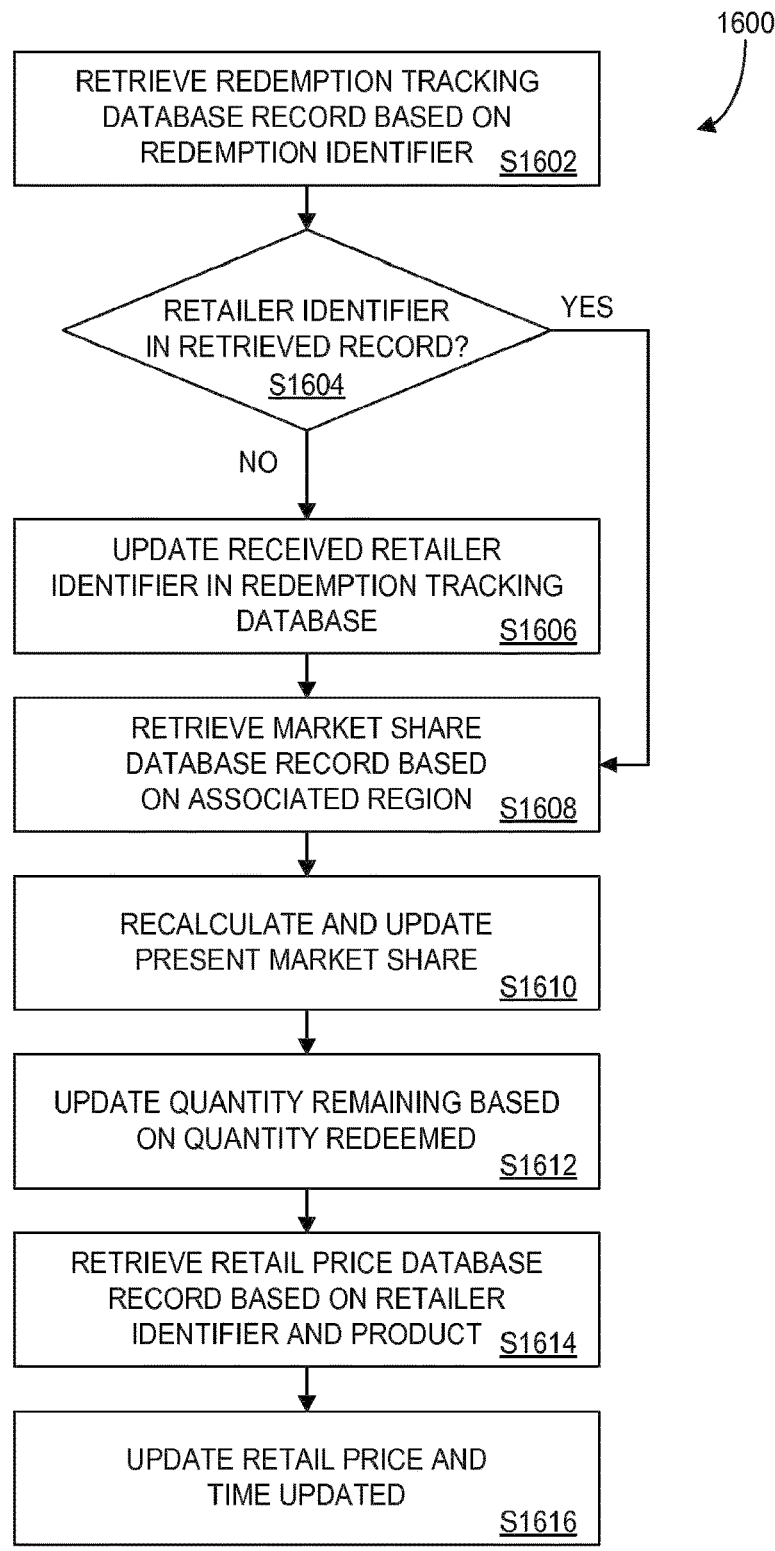
FIG. 14 is a flow chart of process steps to update stored information based on redemption information according to one embodiment of the present invention.

FIG. 14 illustrates process steps 1600 according to one embodiment of the present invention. Specifically, the process steps 1600 describe one embodiment of step S1506 of the process steps 1500. The process steps 1600 are, in one embodiment, embodied in the program 500 and executed by the processor 210 of the controller 200. Of course, the process steps 1600 may be stored and executed wholly or in part by other devices, such as devices in communication with the controller 200.

The process steps 1600 begin at step S1602, in which a database record from the redemption tracking database 1100 is retrieved based on a redemption identifier received with redemption information in step S1504. To illustrate an example of step S1602, FIG. 15A shows a record of the redemption transaction database 1200 including redemption information received in step S1504. Based on the redemption information, and primarily based on the redemption identifier 1210 RED 1234, the record of the redemption tracking database 1100 shown in FIG. 15B is retrieved in step S1602.

Next, in step S1604, it is determined whether a retailer is identified in the retrieved record. Step S1604 is used because, in some embodiments, no retailer is initially assigned to an agreement. That is, a customer is not directed to a specific retailer upon acceptance of an offer from the customer. Rather, the customer is allowed to initially redeem an agreement product under an agreement from any particular retailer. However, after an initial redemption, the customer must redeem the agreement product under the agreement at the retailer which provided the initial redemption. If it is determined in step S1604 that a retailer identifier 1150 is present in the retrieved record, flow proceeds to step S1608. If not, a retailer identifier included in the received redemption information is recorded in the retrieved record of the redemption tracking database 1100 in step S1606.

In the current example, no retailer identifier 1150 exists in the retrieved record. Accordingly, the retailer identifier field 1150 in the retrieved record is populated with the retailer identifier R-3252 in step S1606 and flow continues to step S1608.

Figure 15C:
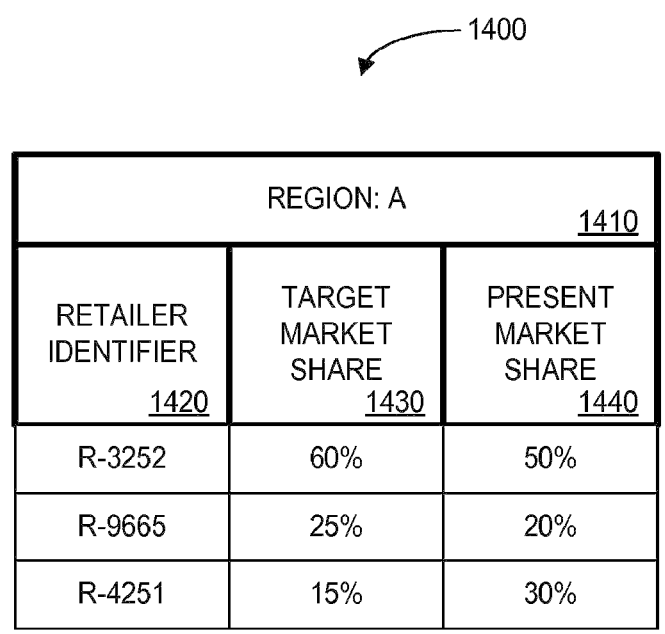

A record of the market share database 1400 is retrieved based on a region indicated by the received redemption information in step S1608. For example, the received redemption information shown in FIG. 15A reflects the retailer identifier 1220 R-3252. According to the retailer database 800, the retailer identifier 810 R-3252 is associated with region 870 "A". Therefore, in step S1608, a portion of the market share database 1400 corresponding to region 1410 "A" is retrieved. FIG. 15C shows the portion of the market share database 1400 retrieved in step S1608 according to the current example.

Figure 15D:

The present market share 1440 for each record in the retrieved portion of the market share database 1400 is recalculated and updated based on the received redemption information in step S1610. As described above, the market share may reflect a number of redemptions under agreements between customers and the controller 200, a number of gallons redeemed at a retailer in relation to a total number of gallons redeemed under such agreements, or some other market. FIG. 15D shows the present market share 1440 of each record as recalculated and updated according to step S1610.

Figure 15E:
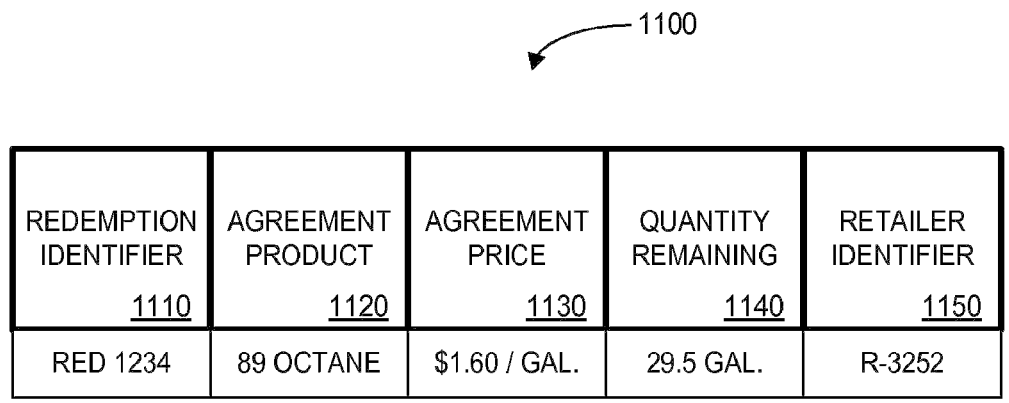

Next, in step S1612, a quantity remaining 1140 in the redemption tracking database 1100 is updated based on the received redemption information. As shown in FIG. 15A, the quantity redeemed 1250 according to the received redemption information was 10.5 gallons. Accordingly, 10.5 gallons are subtracted from the quantity remaining 1140 shown in the redemption tracking database 1100. The updated record of the redemption tracking database is shown in FIG. 15E. As shown, the quantity remaining 1140 in the record is equal to (40−10.5)=29.5 gallons. FIG. 15E also shows the retailer identifier 1150 as updated according to step S1606.

In step S1614, a record of the retail price database 1300 is retrieved based on the received information, and specifically based on the retailer identifier 1220 and product 1230. FIG. 16A shows a sample record of the redemption transaction database 1200 which will be used to describe one example of step S1614. In other words, for the purposes of the foregoing example of steps S1614 and S1616, it is assumed that the redemption information received prior to step S1602 included the data shown in the record of FIG. 16A. Based on the retailer identifier 1220 and the product 1230 shown in FIG. 16A, the record of the retail price database 1300 shown in FIG. 16B is retrieved in step S1614. In step S1616, the retail price 1330 and the time updated 1340 of the retrieved record are updated. FIG. 16C shows the record of FIG. 16B as updated with the data of FIG. 16A in step S1616. Specifically, the retail price 1330 for the product 1320, 87 octane, has been changed from $1.48 per gallon to $1.50 per gallon, in the time updated 1340 has been changed from Feb. 14,2003, 14:53 to Feb. 2 2003, 17:35. The process steps 1600 terminate after step S1616. Of course, methods other than the process steps 1600 may be used to perform step S1506 of the process steps 1500.

Figure 17:
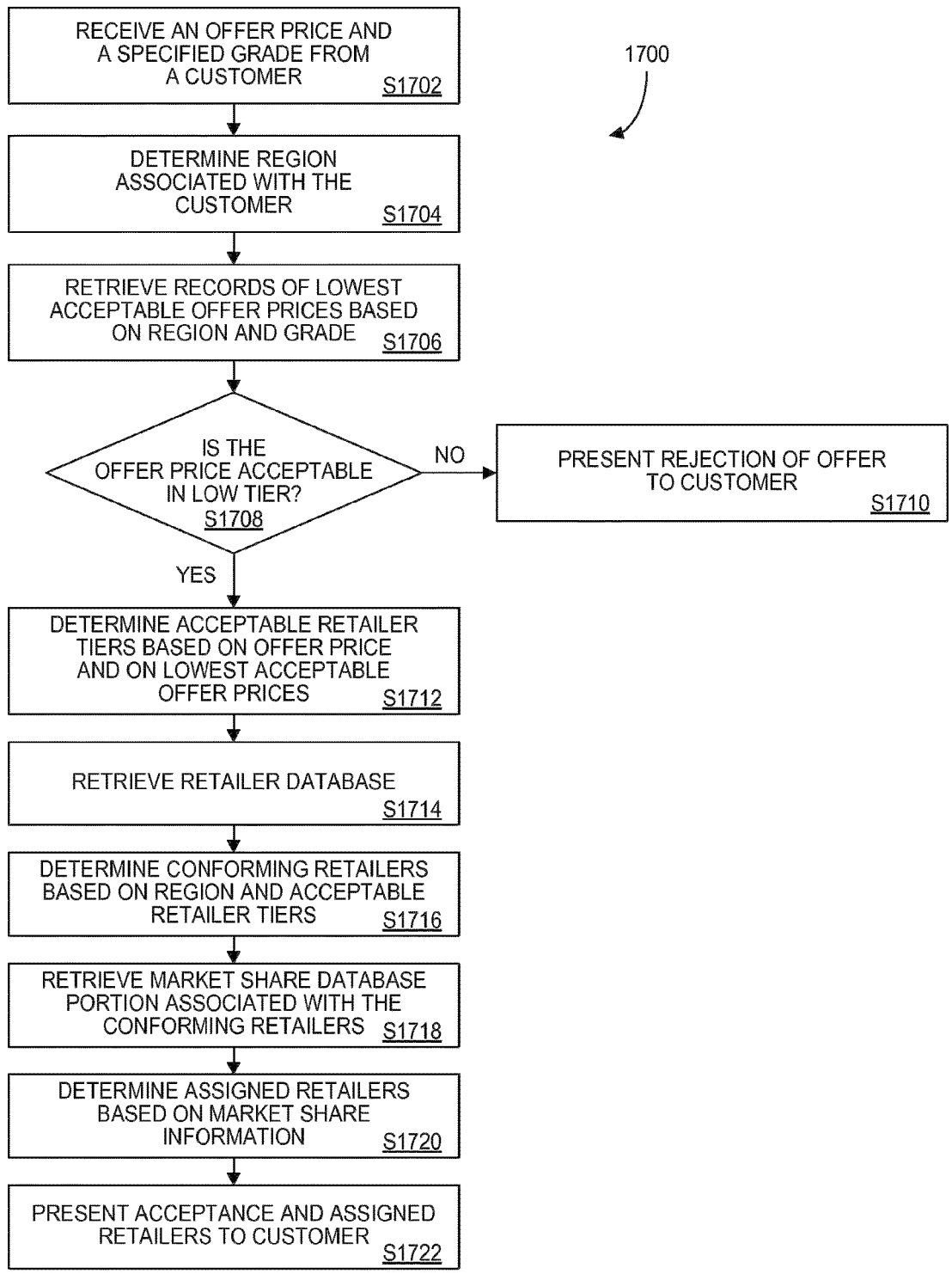
FIG. 17 is a flow chart of process steps to determine whether to accept an offer based on received redemption information according to one embodiment of the present invention.

FIG. 17 illustrates process steps 1700 according to one embodiment of the present invention. Specifically, the process steps 1700 reflect process steps of one embodiment of steps S1510 and S1512 of the process steps 1500. Flow begins at step S1702, in which an offer is received from a customer including at least an offer price and a specified grade of gasoline. For example, in step S1702, the controller 200 may receive from the customer device 100 data indicating an offer to purchase 87 octane gasoline for $1.55 per gallon. Next, in step S1704, a region associated with the customer is determined. As shown in the customer database 900, a region 940 is associated with each customer identifier 910 therein. Accordingly, a region may be determined in step S1704 by reference to a customer identifier identifying the customer and to an appropriate record of the customer database 800.

Figure 18:
FIG. 18 illustrates a tabular representation of a portion of a retailer tier database for use in explaining the FIG. 17 process steps.

Based on the region determined in step S1704 and the grade received in step S1702, records specifying lowest acceptable offer prices are retrieved in step S1706. FIG. 18 shows records of the retailer tier database 1000 retrieved according to step S1706. As shown, the records correspond to region 1010 "A" and to 87 octane gasoline. After the records are retrieved in step S1706, it is determined in step S1708 whether the received offer price is acceptable in the "low" tier 1020 reflected in the records. According to the data shown in FIG. 18, the lowest acceptable offer price 1030 corresponding to the retailer tier 1020 "low" is $1.00 per gallon. Since the offer price received in step S1702 ($1.55 per gallon) is greater than $1.00 per gallon, it is determined in step S1708 that the offer price is acceptable in the "low" tier 1020 and flow proceeds to step S1712. If the received offer price in the present example was less than $1.00 per gallon, flow would proceed from step S1708 to step S1710. In step S1710, a rejection of the received offer is presented to the customer, for example by transmitting a message from the controller 200 to the customer device 100 used to submit the offer.

Returning to step S1712, acceptable retailer tiers are therein determined based on the retrieved records and on the received offer price. In one embodiment, the determination in step S1712 simply involves comparing the received offer price to each of the lowest acceptable offer prices 1030. A retailer tier 1020 is determined to be an unacceptable retailer tier if its associated lowest acceptable offer price 1030 is greater than the received offer price. According to the present example, each of retailer tiers 1020 "high", "medium", and "low" are determined in step S1712 to be acceptable retailer tiers. On the other hand, if the received offer price were $1.40 per gallon, the acceptable retailer tiers 1020 determined in step S1712 would be "medium" and "low".

The retailer database 800 is retrieved in step S1714. Then, in step S1716, conforming retailers are determined based on the region determined in step S1704 and the acceptable retailer tiers determined in step S1712. A conforming retailer is a retailer associated with the determined region and with one of the acceptable retailer tiers. In the example described above, the acceptable retailer tiers were determined to be "high", "medium", and "low". Based on the data of the retailer database 800 shown in FIG. 6, three retailers, identified by retailer identifiers 810 R-3252, R-9665 and R-4251, are associated with region 870 "A" and one of the acceptable retailer tiers.

Once the conforming retailers are determined in step S1716, a portion of the market share database 1400 corresponding to the subject region is retrieved in step S1718. A portion of the market share database 1400 corresponding to the region 1410 "A" which may be retrieved in step S1718 is shown in FIG. 12. Based on information in the market share database 1400, assigned retailers are determined in step S1720. Assigned retailers are those retailers at which the customer may redeem an agreement product. For example, the portion of the market share database 1400 shown in FIG. 12 reflects records corresponding to the conforming retailers. For each record shown, the target market share 1430 is compared to the present market share 1440. In the present example, the target market share 1430 is greater than the present market share 1440 only in the record associated with the retailer identifier 1420 R-3252. Accordingly, each other retailer reflected in the database 1400 is understood to possess more market share than allotted. It is therefore determined in step S1720 that the assigned retailer is the retailer identified by the retailer identifier 1420 R-3252, or, according to the retailer database 800 of FIG. 6, "Amoco #36".

The controller 200 may also assign a retailer to an agreement in step S1720 if no redemption information has been received from that retailer for a certain period of time, or if an amount of redemption information received relating to the retailer is low.

After step S1720, an acceptance of the received offer and the assigned retailer (or retailers) are presented to the customer. In one embodiment of step S1720, data is transmitted to the customer device 100 using which an offer was submitted by the customer, the data indicating that the offer has been accepted, the offer price, the specified grade, the specified amount, if any, and the assigned retailers. Also presented to the customer in step S1722 may be a map and/or directions to the assigned retailers.

Additional Embodiments

The following are several examples which illustrate additional embodiments of the present invention. These examples do not constitute a definition of all possible embodiments, and those skilled in the art will understand that the present invention is amenable to many other embodiments. Further, although the following examples are briefly described for clarity, those skilled in the art will understand how to make any changes, if necessary, to the above-described system to accommodate these and other embodiments and applications.

According to one additional embodiment, received redemption information is used to determine an offer to present to a customer. For example, if received redemption information indicates that prices at a particular gasoline station or other type of retailer are much lower than prices at other retailers in a same or nearby region, the controller 200 may determine an offer including a sale price and a product, and present the offer to customers by broadcasting messages to electronic mail accounts, to publicly-available kiosks, via web pages, or the like. Upon accepting such an offer, the customer would be bound to the resulting agreement.

As described in detail in application Ser. No. 09/540,709, cross subsidy offers may be used by the controller 200 in determining whether to accept a customer offer. Moreover, suitability of a particular cross subsidy offer may depend upon received redemption information. For example, if a cross subsidy offer is available to make up a $0.10 difference between an offer price and a retail price, the cross subsidy offer may be used if received redemption information indicates that a current retail price is less than $0.10 above the offer price.

The customer may also be prompted with survey questions relating to, for example, service quality, cleanliness of the retailer, etc., at the time of the redemption, with the answers being transmitted to the controller 200 using a customer device or other devices. Answers to the questions could then be incorporated into the determination of step S1510 and/or step S1512.

The received redemption information could be used to update information presented to subsequent customers. For example, in a case that received redemption information indicates that prices at a particular retailer are much higher than at other retailers, the particular retailer may not be presented to customers as a potential assigned retailer. In another example, updated pricing information may be used to determine a current average retailer price for a group of retailers, and, if received redemption information indicates that a particular retailer's prices are much lower than the current average retail price, the retailer is presented to the customer with an indication that the retailer will likely be an assigned retailer if an offer submitted by the customer is accepted.

In other embodiments, redemption information is filtered prior to reception thereof by the controller 200. Such filters may be implemented at the retailer level or at the fleet card network level, in which the network controls what information is transmitted to the controller 200. Alternatively, all information may be transmitted to the controller 200, which determines what information is actually stored, used to update stored information and/or used in a decisioning process such as step S1510. For example, redemption information may only be sent to or used by the controller 200 if a retail price reflected by the information is greater than or less than 10 percent of an average retail price or if the customer has made additional purchases in addition to redemption of an agreement product.

In a case that received redemption information includes information about items purchased during a redemption in addition to the agreement product, the information may be used to track an amount of extra revenue that the controller 200 generates for the retailer. Such information may be useful for negotiating payment and/or settlement terms between the retailer and the controller 200.

The acceptability of a customer's offer may be affected by the customer's history of providing redemption information to the system. For example, if a customer consistently redeems a product from a retailer on particular days and/or at particular times such that the controller 200 relies on redemption information generated by the customer, the controller 200 may be willing to accept an offer price from the customer which would not be accepted from another customer having a different customer history.

A system according to the invention may also, based on received redemption information, offer an upsell to a customer in response to an offer from the customer. For example, if a customer offers to purchase 87 octane gasoline for $1.25 per gallon and, according to received redemption information, the retail prices of 87 octane gasoline and 89 octane gasoline are $1.26 per gallon and $1.30 per gallon, respectively, the controller 200 may inform the customer that the customer may establish an agreement to purchase 89 octane gasoline upon increasing the offer price by five cents. Alternatively, if the customer's offer price is lower than a lowest acceptable price for the offer product, the system may offer to provide a lower-valued substitute product for the offer price.

Received redemption information may also be used to adjust a default agreement quantity. In this regard, a customer owning a small car may be required to purchase gallons by the tankful, with a tankful being defined as 10 gallons. If received redemption information indicates that an average number of gallons redeemed by customers owning a small car is 8.25 gallons, a tankful may be redefined as 8.25 gallons or some other amount.

Although the present invention has been described with respect to particular embodiments, those skilled in the art will note that various substitutions and modifications may be made to those embodiments without departing from the spirit and scope of the present invention.

What is claimed is:

1. A device for implementing a recursive sales pipeline between a customer and a plurality of retailers, the device comprising a processor and a memory, the memory storing a program that, when executed by the processor, causes the device to:

provide, to a customer device, an associated redemption identifier, the associated redemption identifier indicative of a predefined agreement;

access a redemption tracking database, the redemption tracking database configured to store data in a plurality of redemption tracking records, each redemption tracking record comprising a plurality of redemption tracking fields, each redemption tracking record indicative of a particular agreement, each redemption tracking field indicative of a portion of the particular agreement, a redemption tracking record associated with the predefined agreement comprised of redemption tracking fields storing information indicative of the associated redemption identifier, a first product, a first price, a first product retailer at which the redemption identifier is redeemable, and the customer device to which the redemption identifier was provided;

receive, in real-time, from a first product retailer device associated with the first product retailer, upon provision of the first product to the customer according to the predefined agreement associated with the redemption identifier, redemption information, the redemption information relating to the provision of the first product and comprising global positioning system (GPS) information indicative of a redemption location at which the first product is redeemed and a current retail price of the first product;

access, upon reception of the redemption information, a redemption transaction database, to add an associated redemption transaction record, the associated redemption transaction record indicative of the redemption information and added in accordance with the redemption information, each redemption transaction record comprised of a plurality of redemption transaction fields, wherein the redemption tracking record associated with the associated redemption identifier comprises redemption transaction fields storing the redemption identifier, data indicative of the first product, a quantity, and the redemption location;

determine an offer to provide to the customer device based on the redemption information, the redemption information configured to enable determination of the offer based on the GPS information indicative of a location at which the first product is redeemed;

provide the offer, the offer comprised of a second product, a sale price, and a second product retailer, the second product retailer being different than the first product retailer and having a location in a same region as the redemption location; and subsequent to the provision of the first product to the customer according to the predefined agreement, (i) receiving a second offer from one or more different customer devices, the second offer comprised of at least a second offer price, (ii) accessing dynamically updated redemption information, and (ii) utilizing the dynamically updated redemption information, including a difference between the second offer price and the first price to determine whether to accept the second offer,
wherein the difference between the second offer price and the first price determined to be acceptable in an instance in which the difference meets a predefined threshold,
wherein the predefined threshold is dynamically updated after each offer acceptance, and
wherein the second offer comprised of a second instance of the first product and redeemable within a region associated with the location indicated by the GPS information associated with the redemption information indicative of the location at which the first product was redeemed.

2. The device according to claim 1, wherein the program, when executed by the processor, causes the device to receive the redemption information in a batch along with information relating to other redemptions.

3. The device according to claim 1, wherein the program, when executed by the processor, causes the device to receive the redemption information automatically in response to providing the product to the customer.

4. The device according to claim 1, wherein the program, when executed by the processor, causes the device to receive the redemption information after a time delay.

5. The device according to claim 1, wherein the redemption information further includes a product description.

6. The device according to claim 1, wherein the redemption information further includes information concerning other products purchased during the redemption.

7. The device according to claim 1, wherein the redemption information is received via another party.

8. A non-transitory computer-readable medium storing a program that, when executed by an apparatus, causes the apparatus to:
provide, to a customer device, an associated redemption identifier, the associated redemption identifier indicative of a predefined agreement;
access a redemption tracking database, the redemption tracking database configured to store data in a plurality of redemption tracking records, each redemption tracking record comprising a plurality of redemption tracking fields, each redemption tracking record indicative of a particular agreement, each redemption tracking field indicative of a portion of the particular agreement, a redemption tracking record associated with the predefined agreement comprised of redemption tracking fields storing information indicative of the associated redemption identifier, a first product, a first price, the first product retailer at which the redemption identifier is redeemable, and the customer device to which the redemption identifier was provided;
receive, in real-time, from a first product retailer device associated with the first product retailer, upon provision of the first product to the customer according to the predefined agreement associated with the redemption identifier, redemption information, the redemption information relating to the provision of the first product and comprising global positioning system (GPS) information indicative of a redemption location at which the first product is redeemed and a current retail price of the first product;
access, upon reception of the redemption information, a redemption transaction database, to add an associated redemption transaction record, the associated redemption transaction record indicative of the redemption information and added in accordance with the redemption information, each redemption transaction record comprised of a plurality of redemption transaction fields,
wherein the redemption tracking record associated with the associated redemption identifier comprises redemption transaction fields storing the redemption identifier, data indicative of the first product, a quantity, and the redemption location;
determine an offer to provide to the customer device based on the redemption information, the redemption information configured to enable determination of the offer based on the GPS information indicative of a location at which the product is redeemed;
provide the offer, the offer comprised of a second product, a sale price, and a second product retailer, the second product retailer being different than the first product retailer and having a location in a same region as the redemption location; and
subsequent to the provision of the first product to the customer according to the predefined agreement, (i) receive a second offer from one or more different customer devices, the second offer comprised of at least a second offer price, (ii) access dynamically updated redemption information, and (ii) utilize the dynamically updated redemption information, including a difference between the second offer price and the first price to determine whether to accept the second offer,
wherein the difference between the second offer price and the first price determined to be acceptable in an instance in which the difference meets a predefined threshold,
wherein the predefined threshold is dynamically updated after each offer acceptance, and
wherein the second offer comprised of a second instance of the first product and redeemable within a region associated with the location indicated by the GPS information associated with the redemption information indicative of the location at which the first product was redeemed.

9. The computer-readable medium according to claim 8, wherein the program, when executed by the apparatus, causes the apparatus to receive the redemption information in a batch along with information relating to other redemptions.

10. The computer-readable medium according to claim 8, wherein the program, when executed by the apparatus, causes the apparatus to receive d the redemption information automatically in response to providing the product to the customer.

11. The computer-readable medium according to claim 8, wherein the program, when executed by the apparatus, causes the apparatus to receive d the redemption information after a time delay.

12. The computer-readable medium according to claim 8, wherein the redemption information further includes a product description.

13. The computer-readable medium according to claim 8, wherein the redemption information further includes information concerning other products purchased during the redemption.

14. The computer-readable medium according to claim 8, wherein the redemption information is received via another party.

15. A method for implementing a recursive sales pipeline between a customer and a plurality of retailers, the method comprising:

providing, to a customer device, an associated redemption identifier, the associated redemption identifier indicative of a predefined agreement;

accessing a redemption tracking database, the redemption tracking database configured to store data in a plurality of redemption tracking records, each redemption tracking record comprising a plurality of redemption tracking fields, each redemption tracking record indicative of a particular agreement, each redemption tracking field indicative of a portion of the particular agreement, a redemption tracking record associated with the predefined agreement comprised of redemption tracking fields storing information indicative of the associated redemption identifier, a first product, a first price, the first product retailer at which the redemption identifier is redeemable, and the customer device to which the redemption identifier was provided;

receiving, from a first product retailer device associated with the first product retailer, upon provision of the first product to the customer according to the predefined agreement associated with the redemption identifier, redemption information, the redemption information relating to the provision of the first product and comprising global positioning system (GPS) information indicative of a redemption location at which the first product is redeemed and a current retail price of the first product;

accessing, upon reception of the redemption information, a redemption transaction database, to add an associated redemption transaction record, the associated redemption transaction record indicative of the redemption information and added in accordance with the redemption information, each redemption transaction record comprised of a plurality of redemption transaction fields, wherein the redemption tracking record associated with the associated redemption identifier comprises redemption transaction fields storing the redemption identifier, data indicative of the first product, a quantity, and the redemption location;

determining an offer to provide to the customer device based on the redemption information, the redemption information configured to enable determination of the offer based on the GPS information indicative of a location at which the product is redeemed;

providing the offer, the offer comprised of a second product, a sale price, and a second product retailer, the second product retailer being different than the first product retailer and having a location in a same region as the redemption location; and subsequent to the provision of the first product to the customer according to the predefined agreement, (i) receiving a second offer from one or more different customer devices, the second offer comprised of at least a second offer price, (ii) accessing dynamically updated redemption information, and (iii) utilizing the dynamically updated redemption information, including a difference between the second offer price and the first price to determine whether to accept the second offer, wherein the difference between the second offer price and the first price determined to be acceptable in an instance in which the difference meets a predefined threshold, wherein the predefined threshold is dynamically updated after each offer acceptance, and wherein the second offer comprised of a second instance of the first product and redeemable within a region associated with the location indicated by the GPS information associated with the redemption information indicative of the location at which the first product was redeemed.

16. The method according to claim 15, wherein the redemption information is received in a batch along with information relating to other redemptions.

17. The method according to claim 15, wherein the redemption information is received automatically in response to providing the product to the customer.

18. The method according to claim 15, wherein the redemption information is received after a time delay.

19. The method according to claim 15, wherein the redemption information further includes a product description.

20. The method according to claim 15, wherein the redemption information further includes information concerning other products purchased during the redemption.

21. The method according to claim 15, wherein the redemption information is received via another party.

* * * * *

UNITED STATES PATENT AND TRADEMARK OFFICE
CERTIFICATE OF CORRECTION

PATENT NO.        : 10,169,791 B2
APPLICATION NO.   : 13/620719
DATED             : January 1, 2019
INVENTOR(S)       : Walker et al.

Page 1 of 1

It is certified that error appears in the above-identified patent and that said Letters Patent is hereby corrected as shown below:

On the Title Page

Item (62) Related U.S. Application Data should appear as follows:
"Division of application No. 11/926,769, filed on Oct. 29, 2007, now abandoned, which is a division of application No. 09/605,818, filed on Jun. 28, 2000, now Pat. No. 7,627,498."

Signed and Sealed this
Twelfth Day of November, 2019

Andrei Iancu
*Director of the United States Patent and Trademark Office*